US008572590B2

(12) United States Patent
Lethin et al.

(10) Patent No.: US 8,572,590 B2
(45) Date of Patent: Oct. 29, 2013

(54) METHODS AND APPARATUS FOR JOINT PARALLELISM AND LOCALITY OPTIMIZATION IN SOURCE CODE COMPILATION

(75) Inventors: Richard A. Lethin, New York, NY (US); Allen K. Leung, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 1078 days.

(21) Appl. No.: 12/561,152

(22) Filed: Sep. 16, 2009

(65) Prior Publication Data

US 2010/0070956 A1   Mar. 18, 2010

Related U.S. Application Data

(60) Provisional application No. 61/097,799, filed on Sep. 17, 2008.

(51) Int. Cl.
*G06F 9/45* (2006.01)

(52) U.S. Cl.
USPC .......................................... 717/143; 717/151

(58) Field of Classification Search
USPC ................................. 717/143, 151
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A * | 4/1998 | Balasa et al. | ................... 717/155 |
| 5,920,854 A | 7/1999 | Kirsch et al. | |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |
| 6,279,113 B1 | 8/2001 | Vaidya | |
| 6,327,699 B1 * | 12/2001 | Larus et al. | ................... 717/128 |
| 6,338,057 B1 | 1/2002 | Weeks | |
| 6,651,246 B1 | 11/2003 | Archambault et al. | |

(Continued)

OTHER PUBLICATIONS

International Search Report and the Written Opinion dated Mar. 18, 2010 for PCT Application No. PCT/US2009/057194.

(Continued)

*Primary Examiner* — Li B Zhen
*Assistant Examiner* — Bradford Wheaton
(74) *Attorney, Agent, or Firm* — Goodwin Procter LLP

(57) ABSTRACT

Methods, apparatus and computer software product for source code optimization are provided. In an exemplary embodiment, a first custom computing apparatus is used to optimize the execution of source code on a second computing apparatus. In this embodiment, the first custom computing apparatus contains a memory, a storage medium and at least one processor with at least one multi-stage execution unit. The second computing apparatus contains at least two multi-stage execution units that avow for parallel execution of tasks. The first custom computing apparatus optimizes the code for both parallelism and locality of operations on the second computing apparatus. This Abstract is provided for the sole purpose of complying with the Abstract requirement rules. This Abstract is submitted with the explicit understanding that it will not be used to interpret or to limit the scope or the meaning of the claims.

90 Claims, 19 Drawing Sheets

(56) References Cited

U.S. PATENT DOCUMENTS

| | | | |
|---|---|---|---|
| 6,754,650 | B2 | 6/2004 | Cho et al. |
| 6,772,415 | B1 | 8/2004 | Danckaert et al. |
| 6,785,677 | B1 | 8/2004 | Fritchman |
| 6,792,546 | B1 | 9/2004 | Shanklin et al. |
| 6,880,087 | B1 | 4/2005 | Carter |
| 6,912,526 | B2 | 6/2005 | Akaboshi |
| 6,952,694 | B2 | 10/2005 | Mathur et al. |
| 6,952,821 | B2 | 10/2005 | Schreiber |
| 7,086,038 | B2 | 8/2006 | Cronquist et al. |
| 7,185,327 | B2 | 2/2007 | Scales |
| 7,225,188 | B1 | 5/2007 | Gai et al. |
| 7,260,558 | B1 | 8/2007 | Cheng et al. |
| 7,594,260 | B2 | 9/2009 | Porras et al. |
| 7,634,566 | B2 | 12/2009 | Turner et al. |
| 7,757,222 | B2 | 7/2010 | Liao et al. |
| 8,087,010 | B2 | 12/2011 | Eichenberger et al. |
| 8,108,845 | B2 | 1/2012 | Little et al. |
| 8,230,408 | B2 | 7/2012 | Eng |
| 8,250,550 | B2 | 8/2012 | Luszczek et al. |
| 8,255,890 | B2 | 8/2012 | Luszczek et al. |
| 8,307,347 | B2 | 11/2012 | Austin et al. |
| 2002/0021838 | A1 | 2/2002 | Richardson et al. |
| 2003/0097652 | A1 | 5/2003 | Roediger et al. |
| 2004/0034754 | A1 | 2/2004 | Schreiber |
| 2004/0068501 | A1 | 4/2004 | McGoveran |
| 2005/0114700 | A1 | 5/2005 | Barrie et al. |
| 2006/0048121 | A1 | 3/2006 | Blainey et al. |
| 2006/0048123 | A1 | 3/2006 | Martin |
| 2006/0085858 | A1 | 4/2006 | Noel et al. |
| 2007/0033367 | A1 | 2/2007 | Sakarda et al. |
| 2007/0074195 | A1 | 3/2007 | Liao et al. |
| 2007/0192861 | A1 | 8/2007 | Varghese et al. |
| 2008/0010680 | A1 | 1/2008 | Cao et al. |
| 2009/0037889 | A1 | 2/2009 | Li et al. |
| 2009/0083724 | A1 | 3/2009 | Eichenberger et al. |
| 2009/0119677 | A1 | 5/2009 | Stefansson et al. |
| 2009/0259997 | A1* | 10/2009 | Grover et al. ............ 717/136 |
| 2009/0307673 | A1* | 12/2009 | Eichenberger et al. ....... 717/160 |
| 2010/0050164 | A1* | 2/2010 | Van De Waerdt et al. .... 717/159 |
| 2010/0162225 | A1* | 6/2010 | Huang et al. ............ 717/171 |

OTHER PUBLICATIONS

International Preliminary Report on Patentability dated Oct. 27, 2011 for PCT Application No. PCT/US2010/031524.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
International Search Report and Written Opinion dated Dec. 1, 2010 for PCT/US2010/033049.
International Search Report and the Written Opinion dated Nov. 26, 2010 for PCT Application No. PCT/US2010/031524.
Bondhugula et al, Toward Effective Automatic Parallelization for Multipar core Systems, In proceeding of 22nd IEEE International Symposium on Parallel and Distributed Processing, (IPDPS 2008) Miami, Florida USA, Apr. 14, 2008.
Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000,14 pgs.
Aho et al, Compilers, Principles, Techniques, and Tools, Addision-Wesley Publishing Company, pp. 173-186, Reading, MA 1985.
Aho et al, Efficiant String Matching: An Aid to Bibliographic Search, Communications of the ACM, vol. 18, No. 6, Jun. 1975, pp. 333-340.
Aigner et al, An Overview of the SUIF2 Compiler Infrastructure, Computer Systems Laboratory, Standford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.

Ancourt et al, Scanning Polyhedra with DO Loops, Proceedings of the third ACM SIGPLAN symposium on Principles and practice of parallel programming, p. 39-50, Apr. 21-24, 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology 13 CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model Is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43.
Bondhugula et al, Automatic Mapping of Nested Loops to FPGAs, OSU, Mar. 19, 2007.
Bondhugula et al, A Practical and Fully Automatic Polyhedral Program Optimization System, OSU OSU-CISRC-10/07-TR70.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes, Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1- 9.
Clauss et al, Deriving Formulae to Count Solutions to Parameterized Linear Systems using Ehrhart Polynomials: Applications to the Analysis of Nested-Loop Programs, Apr. 10, 1997.
ClearSpeed—Accelerator Technology Primer, ClearSpeed Technology Primer, ClearSpeed Technology, Inc., 2006.
ClearSpeed—ClearSpeed Programming Model: An introduction, ClearSpeed Technology Inc. 2007.
ClearSpeed—ClearSpeed Programming Model: Optimizing Performance, ClearSpeed Technology Inc. 2007.

(56) References Cited

OTHER PUBLICATIONS

ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Overview of Architecture: System Level (host) Architecture and ClearSpeed Architecture, ClearSpeed Technology Inc., 2007.
ClearSpeed—ClearSpeed Programming Model: Card-side Libraries, ClearSpeed Technology Inc. 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.
ClearSpeed Technical Training: Software Development, ClearSpeed Technology Inc., 2007.
ClearSpeed, Introduction to ClearSpeed Acceleration, Powerpoint presentation, ClearSpeed Technology Plc, 2007, 133 pgs.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, pp. 1-16.
Cytron et al, Efficiently Computing Static Single Assignment Form and the Control Dependence Graph, Mar. 7, 1991, pp. 1-52.
Darte et al, Algorithm, Chapter 5: Parallelism Detection in Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM Cases'03, pp. 298-308, 2003.
Darte et al, Lattice-Based Memory Allocation, IEEE Transactions on Computers, vol. 54, No. 10, Oct. 2005, pp. 1242-1527.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Search Report and the Written Opinion of the International Searching Authority dated Jan. 17, 2008 for PCT/US2007/772260.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transactions on Programming Languages and Systems, vol. 24, No. 4, pp. 409-453, Jul. 2002.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation 13 Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.

(56) References Cited

OTHER PUBLICATIONS

Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, Appears in the 24th Annual ACM SIGPLAN-SIGACT Symposium on Principles of Programming Languages, Jan. 1997, pp. 1-14.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
Mcwhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report#1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM Micro, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, 40 pgs.
Reservoir Labs, Inc., Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Instrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microacritecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM Cases'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis 13 Automatic Array Privatization and Demand-Driven Symoblic Analysis, University of Illinois, 1995, pp. 1-144.
Udupa et al, Deobfuscation 13 Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation 13 A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.

(56) References Cited

OTHER PUBLICATIONS

Whaley et al, An Efficient Inclusion-Based Points-To Analysis for Strictly-Typed Languages, Lecture Notes in Computer Science, vol. 2477, 2002, 16 pgs.

Wilde, D. K., A Library for Doing Polyhedral Operations, IRISA, Publication No. 785, 1993, pp. 1-48.

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

Xue, On Tiling as a Loop Transformation, Department of Mathematics, Statistics and Computing Science, University of New England, Australia, 15 pgs.

International Report on a Patentability dated Mar. 31, 2011 for PCT Application No. PCT/US2009/057194.

Jonsson et al., "Verifying Safety Properties of a Class of Infinite-State Distributed Algorithms", Lecture Notes in Computer Science, 1995, vol. 939, pp. 42-53.

Mahajan et al, "Zchaff2004: An Efficient SAT Solver", LNCS, 2005, pp. 360-375.

Aloul et al, Solution and Optimization of Systems of Pseudo-Boolean Consraints, IEEE Transactions on Computers, vol. 56, No. 1 0, Oct. 2007, pp. 1415-1424.

Buluc et al, Parallel Sparse Matrix-Matrix Multiplication and Indexing: Implementation and Experiments, SIAM Journal of Scientific Computing (SISC), 2012.

Chang et al, Parallel sparse supports for array intrinsic functions of Fortran 90, J. Supercomput. 18(3):305-339, (2001).

Davis, Direct Methods for Sparse Linear Systems. SIAM, 2006 (100 pgs.).

Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.

Gundersen et al, Sparsity in higher order methods for unconstrained optimization, Optimization Methods and Software, 27(2):275-294 (2012).

Gustavson, Two Fast Algorithms for Sparse Matrices: Multiplication and Permuted Transposition, ACM Transactions on Mathematical Software, 4(3): 250-269, 1978.

Kolda et al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-$(R_1,R_2,\ldots,R_N)$ Approximation of Higher-Order Tensors, SIAM J. Matrix Anal. Appl., 21:1324-1342, Mar. 2000.

Lin et al, Efficient data compression methods for multidimensional sparse array operations based on the EKMR scheme, IEEE Trans. Comput., 52(12):1640-1646, (2003).

Lin et al, Efficient Representation Scheme for Multidimensional Array Operations, IEEE Transactions on Computers, 51:327-345, 2002.

Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.

Vera et al, An Accurate Cost Model for Guiding Data Locality Transformations—Politecnica de Catalunya-Barcelona University—Sep. 2005.

\* cited by examiner (1 of 2)

(2 of 2)

(1 of 2)

(2 of 2)

(1 of 2)

(2 of 2)

(1 of 2)

(2 of 2)

METHODS AND APPARATUS FOR JOINT PARALLELISM AND LOCALITY OPTIMIZATION IN SOURCE CODE COMPILATION

GOVERNMENT INTERESTS

Portions of this invention were made with U.S. Government support under SBIR contract/instrument W9113M-08-C-0146. The U.S. Government has certain rights.

CROSS REFERENCE TO RELATED APPLICATIONS

This application is related to and claims the benefit of priority to U.S. Provisional Application Ser. No. 61/097,799, entitled "STATIC SOFTWARE TOOLS TO OPTIMIZE BMD RADAR TO COTS HARDWARE", filed Sep. 17, 2008, the entirety of which is hereby incorporated by reference. This application is additionally related to the subject matter contained in co-owned, co-pending U.S. patent application Ser. No. 12/365,780 entitled "METHODS AND APPARATUS FOR LOCAL MEMORY COMPACTION" filed Feb. 4, 2009 which claims priority to U.S. Provisional Application Ser. No. 61/065,294 both of which are additionally incorporated by reference herein in their entirety.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core. One limitation that these architectures experience is that the current commercially available compilers can not efficiently take advantage of the increase of computational resources.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a tradeoff between exploiting parallelism and exploiting locality to reduce the ever widening disparity between memory bandwidth and the frequency of processors: the memory wall. Indeed, the speed and bandwidth of the memory subsystems have always been a bottleneck, which worsens when going to multi-core. Since optimization problems are associated with huge and unstructured search spaces, this combinational task is poorly achieved by current compilers, resulting in weak scalability and disappointing sustained performance.

Even when programming models are explicitly parallel (threads, data parallelism, vectors), they usually rely on advanced compiler technology to relieve the programmer from scheduling and mapping the application to computational cores, understanding the memory model and communication details. Even provided with enough static information or annotations (OpenMP directives, pointer aliasing, separate compilation assumptions), compilers have a hard time exploring the huge and unstructured search space associated with these mapping and optimization challenges. Indeed, the task of the compiler can hardly been called optimization anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to the highly complex and heterogeneous machine.

The polyhedral model promises to be a powerful framework to unify coarse grained and fine-grained parallelism extraction with locality and communication optimizations. To date, this promise has yet been unfulfilled as no existing affine scheduling and fusion techniques can perform all these optimizations in a unified (i.e., non-phase ordered) and unbiased manner. Typically, parallelism optimization algorithms optimize for degrees of parallelism, but cannot be used to optimize locality or communication. In like manner, algorithms used for locality optimization cannot be used for the extracting parallelism. Additional difficulties arise when optimizing source code for the particular architecture of a target computing apparatus.

Therefore there exists a need for improved source code optimization methods and apparatus that can optimize both parallelism and locality.

SUMMARY OF THE INVENTION

The present invention provides a system, apparatus and methods for overcoming some of the difficulties presented above. Various embodiments of the present invention provide a method, apparatus, and computer software product for optimization of a computer program on a first computing apparatus for execution on a second computing apparatus.

In an exemplary provided method computer program source code is received into a memory on a first computing apparatus. In this embodiment, the first computing apparatus' processor contains at least one multi-stage execution unit. The source code contains at least one arbitrary loop nest. The provided method produces program code that is optimized for execution on a second computing apparatus. In this method the second computing apparatus contains at least two multi-stage execution units. With these units there is an opportunity for parallel operations. In its optimization of the code, the first computing apparatus takes into account the opportunity for parallel operations and locality and analyses the tradeoff of execution costs between parallel execution and serial execution on the second computing apparatus. In this embodiment, the first computing apparatus minimizes the total costs and produces code that is optimized for execution on the second computing apparatus.

In another embodiment, a custom computing apparatus is provided. In this embodiment, the custom computing apparatus contains a storage medium, such as a hard disk or solid state drive, a memory, such as a Random Access Memory (RAM), and at least one processor. In this embodiment, the at least one processor contains at least one multi-stage execution unit. In this embodiment, the storage medium is customized to contain a set of processor executable instructions that, when executed by the at least one processor, configure the custom computing apparatus to optimize source code for execution on a second computing apparatus. The second computing apparatus, in this embodiment, is configured with at least two multi-stage execution units. This configuration allows the execution of some tasks in parallel, across the at least two execution units and others in serial on a single execution unit. In the optimization process the at least one processor takes into account the tradeoff between the cost of parallel operations on the second computing apparatus and the cost of serial operations on a single multi-stage execution unit in the second computing apparatus.

In a still further embodiment of the present invention a computer software product is provided. The computer software product contains a computer readable medium, such as a CDROM or DVD medium. The computer readable medium contains a set of processor executable instructions, that when executed by a multi-stage processor within a first computing apparatus configure the first computing apparatus to optimize computer program source code for execution on a second computing apparatus. Like in the above described embodiments, the second computing apparatus contains at least two execution units. With at least two execution units there is an opportunity for parallel operations. The configuration of the first computing apparatus includes a configuration to receive computer source code in a memory on the first computing apparatus and to optimize the costs of parallel execution and serial execution of tasks within the program, when executed on the second computing apparatus. The configuration minimizes these execution costs and produces program code that is optimized for execution on the second computing apparatus.

BRIEF DESCRIPTION OF THE DRAWINGS

Various embodiments of the present invention taught herein are illustrated by way of example, and not by way of limitation, in the figures of the accompanying drawings, in which.

Figure 1:
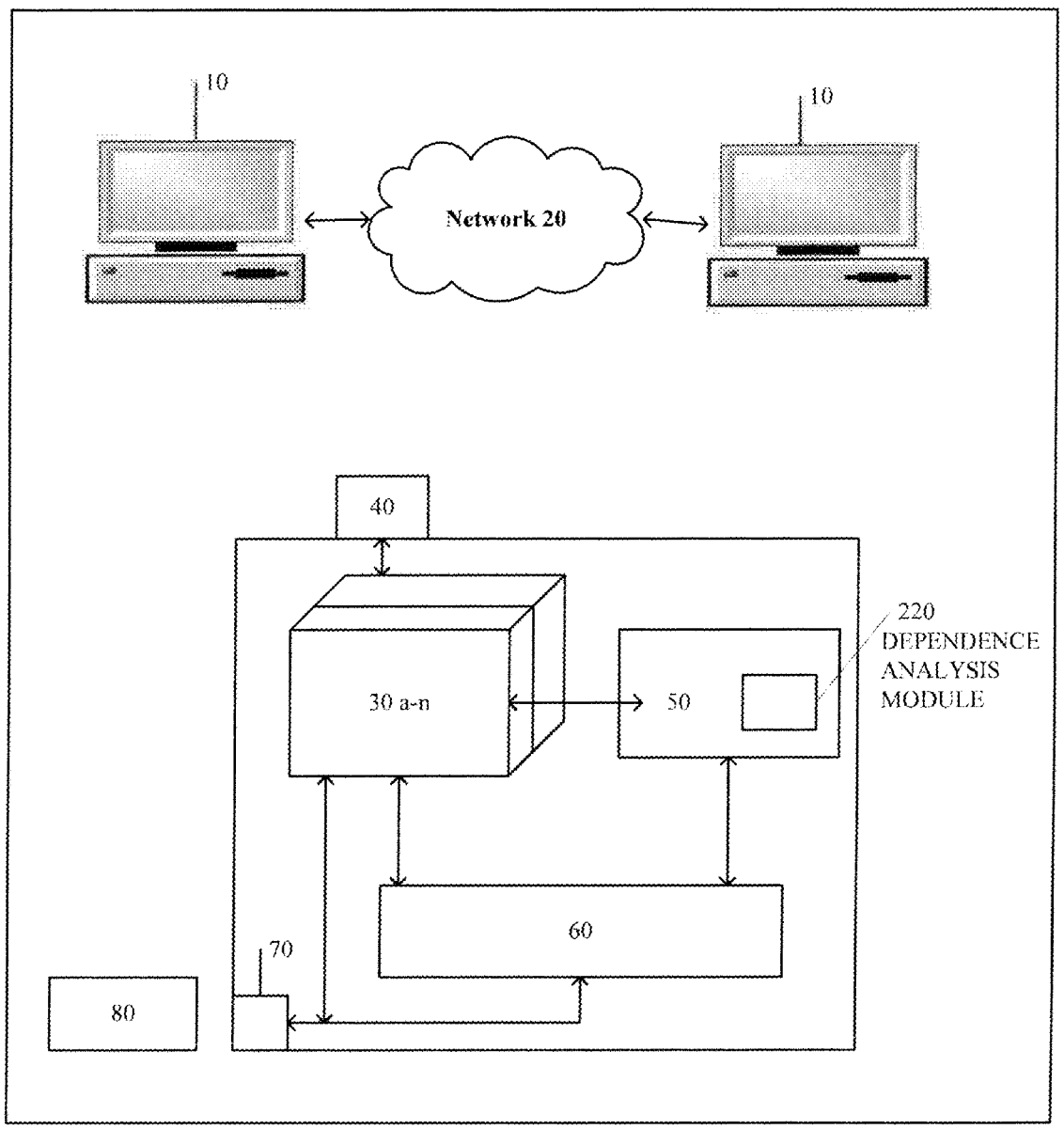
FIG. 1 illustrates a computer network and a computing apparatus consistent with provided embodiments.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Embodiments of the present invention provide a custom computing apparatus, illustrated in FIG. 1, that is configured to optimize computer source code for operation on a second computing apparatus. As illustrated, first custom computing apparatus $10(a)$ is configured to communicate with second computing apparatus $10(b)$ across network 20. A further illustration of computing apparatus 10 is provided in FIG. 1. In this illustration custom computing apparatus $10(a)$ contains at least one processor 30 ($a$-$n$), a communication port 40 communicating with the at least one processor 30 ($a$-$n$). Custom computing apparatus $10(a)$ additionally includes memory 50, which in some embodiments includes dependence analysis module 220. Custom computing apparatus $10(a)$, in some embodiments, additionally includes drive 70 configured to accept external storage medium 80. In some embodiments, external storage medium 80 is a CD, in others a DVD. In these embodiments, drive 70 is configured to accept the appropriate external storage medium 80. While CD and DVD are specifically enumerated in these embodiments, there are many external storage media that can be used to practice various aspects of the invention therefore some embodiments are not limited to the particular drive 70 configuration or external media 80. Custom computing apparatus $10(a)$ additionally includes storage medium 60. Storage medium 60 in some embodiments is a hard-disk drive, and in others is a solid state drive. In some embodiments, storage medium 60 contains a set of processor executable instructions that when executed by the at least one processor 30($a$-$n$) configure custom computing apparatus $10(a)$ to optimize computer code for execution on computing apparatus $10(b)$. While custom computing apparatus $10(a)$ and computing apparatus $10(b)$ are illustrated in FIG. 1 communicating over network 20, various embodiments of the invention do not require this inter-computer communication.

Figure 2:
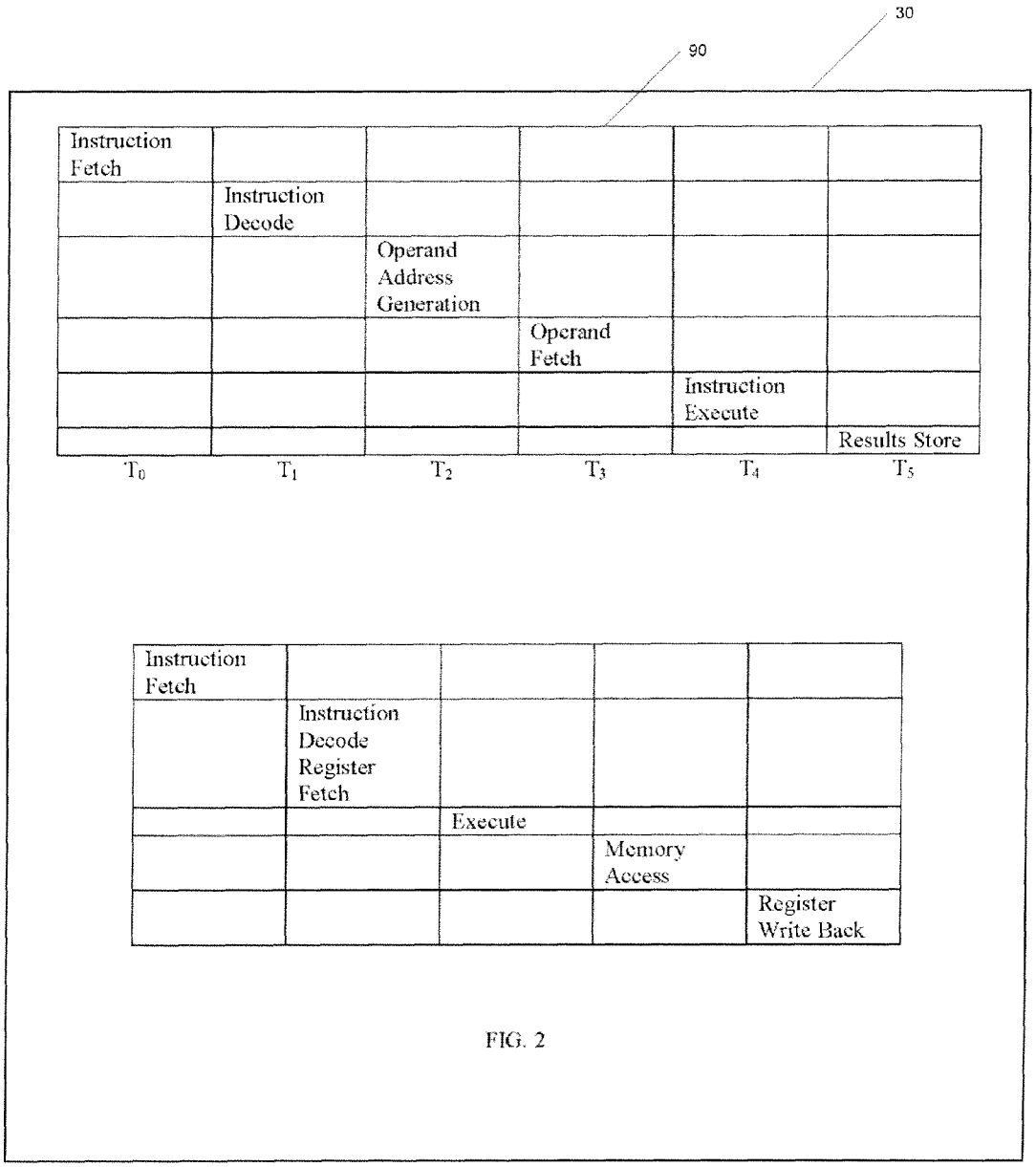
FIG. 2 illustrates processors with multi-stage execution units.

Various embodiments of the present invention are directed to processors containing multi-stage execution units, and in some embodiments multiple execution units. By way of example and not limitation to the particular multi-stage execution unit, FIG. 2 illustrates exemplary multi-stage execution units 90. In one embodiment, a 6-stage execution unit is utilized. In this embodiment, the stages may include instruction fetch, instruction decode, operand address generation, operand fetch, instruction execute, and result store. In another depicted multi-stage architecture, the stages include instruction fetch, instruction fetch & register decode, execute, memory access and register write-back. During routine operation of a multi-stage execution unit instructions are processed sequentially moving from stage to stage. In scheduling operations on multi-stage execution unit processors there are inherent difficulties that arise. For example, one instruction in one stage of the pipeline may attempt to read from a memory location while another instruction is writing to that location. This is problem is confounded in the instance of multiple processing cores. Additionally, in multiple processor and/or multiple core architectures, the locality of data to the execution unit attempting access can create significant delays in processing.

Figure 3:
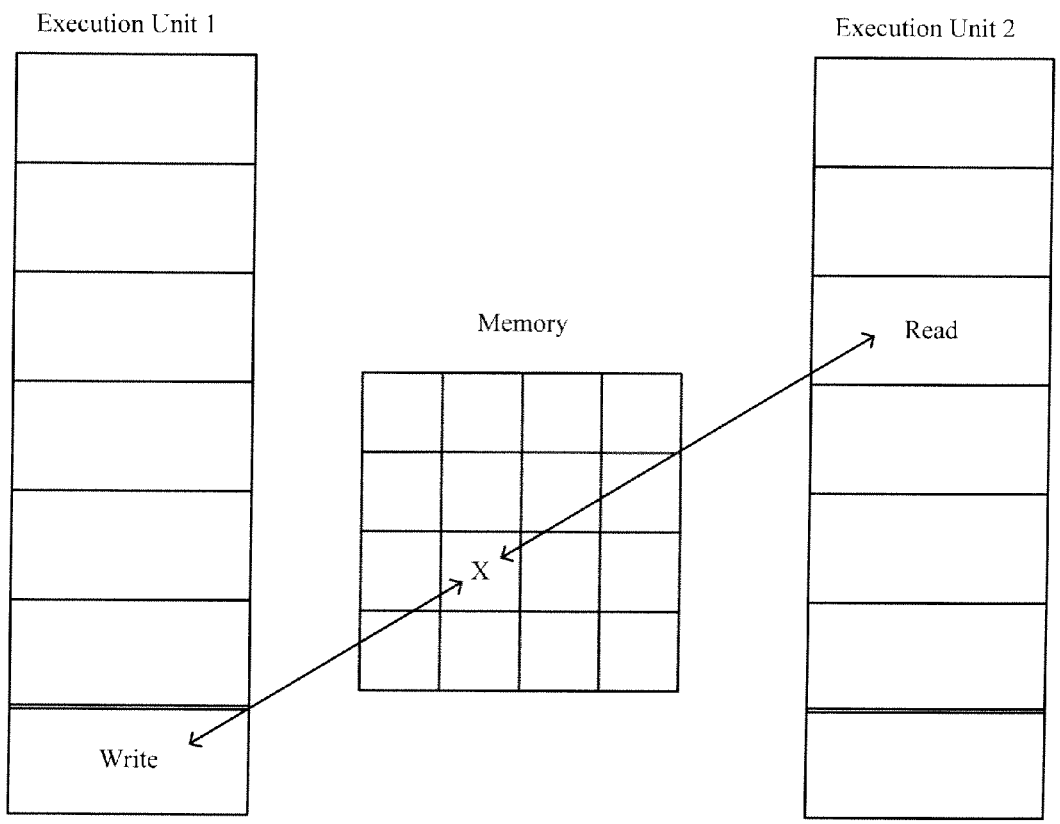
FIG. 3 illustrates a processor with multiple multi-stage execution units.

A further illustration of a multiple execution unit system is depicted in FIG. 3. In this illustration, a first execution unit (Execution Unit 1) is attempting to write to a specific memory location while a second execution unit (Execution unit 2) is attempting to read from that same location. When both read and write occur at the same time, this causes a condition known in the art as a conflicting access which can significantly impact the speed and the correctness of execution. While it may appear that parallel execution of instructions across multiple execution units and/or processors would produce an optimal result this is not always the case. Further, as previously discussed optimization, of source code for parallelism may result in code that is poor in terms of locality or communications. In the prior approaches to code optimization, the converse is additionally true. Optimization of code for locality can result in poor parallelism and under utilization of computing resources. It is therefore an object of embodiments of the present invention to provide a customized computing apparatus, methods, and computer software product that simultaneously optimizes a computer program for execution on a particular computing device with multiple execution units. It is another object of the invention to provide embodiments of methods which can explore the complete solution space for legal schedules for potential solutions. It is a further object of the invention to provide methods containing new formulations that encode the tradeoffs between locality and parallelism directly in the constraints and the objective functions of an optimization problem.

The following code example illustrates loop fusion. Given the following code:

```
int i, a[100], b[100];
for (i = 0; i < 100; i++) {
    a[i] = 1;
}
for (i = 0; i < 100; i++) {
    b[i] = 2;
}
```

The effect of loop fusion is to interleave the execution of the first loop with the execution of the second loop.

```
int i, a[100], b[100];
for (i = 0; i < 100; i++) {
    a[i] = 1;
    b[i] = 2;
}
```

A consequence of loop fusion is that memory locations a[i] and b[i] referenced by the former 2 loops are now accessed in an interleaved fashion. In the former code, memory locations were accessed in the order a[0], a[1], . . . a[100] then b[0], b[1], . . . b[100]. In the code comprising the fused loops, the memory locations are now accessed in the order a[0], b[0], a[1], b[1], . . . a[100], b[100]. Loop fusion can lead to better locality when multiple loops access the same memory locations. It is common general knowledge in the field of compilers that better locality reduces the time a processing element must wait for the data resident in memory to be brought into a local memory such as a cache or a register. In the remainder of this document, we shall say that loops are fused or equivalently that they are executed together when such a loop fusion transformation is applied to the received program to produce the optimized program.

Loop fusion can change the order in which memory locations of a program are accessed and require special care to preserve original program semantics:

```
int i, a[100], b[100];
for (i = 0; i < 100; i++) {
    a[i] = 1;
}
for (i = 0; i < 100; i++) {
    b[i] = 2 + a[i+1];
}
```

In the previous program, the computation of b[i] depends on the previously computed value of a[i+1]. Simple loop fusion in that case is illegal. If we consider the value computed for b[0]=2+a[1], in the following fused program, b[0] will read a[1] at iteration i=0, before a[1] is computed at iteration i=1.

```
int i, a[100], b[100];
for (i = 0; i < 100; i++) {
    a[i] = 1;
    b[i] = 2 + a[i+1];
}
```

It is common general knowledge in the field of high-level compiler transformations that enabling transformations such as loop shifting, loop peeling, loop interchange, loop reversal, loop scaling and loop skewing can be used to make fusion legal.

The problem of parallelism extraction is related to the problem of loop fusion in the aspect of preserving original program semantics. A loop in a program can be executed in parallel if there are no dependences between its iterations. For example, the first program loop below can be executed in parallel, while the second loop must be executed in sequential order:

```
int i, a[100], b[100];
for (i = 0; i < 100; i++) {
    a[i] = 1;
}
for (i = 1; i < 100; i++) {
    b[i] = 2 + b[i-1];
}
```

It is common knowledge in the field of high-level compiler transformations that the problems of fusion and parallelism heavily influence each other. In some cases, fusing 2 loops can force them to be executed sequentially.

Loop permutability is another important property of program optimizations. A set of nested loop is said permutable, if their order in the loop nest can be interchanged without altering the semantics of the program. It is common knowledge in the field of high-level compiler optimization that loop permutability also means the loops in the permutable set of loops dismiss the same set of dependences. It is also common knowledge that such dependences are forward only when the loops are permutable. This means the multi-dimensional vector of the dependence distances has only non-negative components. Consider the following set of loops:

```
int i,j a[100][100], b[100][100];
for (i = 0; i < 99; i++) {
    for (j = 0; j < 99; j++) {
        a[i+1][j+1] = a[i][j] + a[i][j+1];   // statement S
    }
}
```

There are 2 flow dependences between the statement S and itself. The two-dimensional dependence vectors are: (i−(i−1), j−(j−1))=(1,1) and (i−(i−1), j−j)=(1, 0). The components of these vectors are nonnegative for all possible values of i and j. Therefore the loops I and j are permutable and the loop interchange transformation preserves the semantics of the program. If loop interchange is applied, the resulting program is:

```
int i,j, a[100][100], b[100][100];
for (j = 0; j < 99; j++) {
    for (i = 0; i < 99; i++) {
        a[i+1][j+1] = a[i][j] + a[i][j+1];   // statement S
    }
}
```

Loop permutability is important because it allows loop tiling (alternatively named loop blocking). Loop tiling is a transformation that changes the order of the iterations in the program and ensures all the iterations of a tile are executed before any iteration of the next tile. When tiling by sizes (i=2, j=4) is applied to the previous code, the result is:

```
int i,j,ii,jj a[100][100], b[100][100];
for (j = 0; j < 99; j+=4) {
    for (i = 0; i < 99; i+=2) {
        for (jj = 4*j; jj < 4*j+4; jj++) {
            for (ii = 2*i; ii < 2*i+2; ii++) {
                a[ii+1][jj+1] = a[ii][jj] + a[ii][jj+1];   // statement S
            }
        }
    }
}
```

Consider the memory locations written by the statement S. Before tiling, the locations are written in this order: a[1][1], a[1][2] . . . a[1][99], a[2][1], a[2][2] . . . a[2][99], a[3][1] . . . . After tiling, the new order of writes is the following: a[1][1], a[2][1], a[1][2], a[2][2] . . . a[1][4], a[2][4], a[4][1], a[5][1], a[4][2], a[5][2] . . . a[4][4], a[5][4]. . . . It is additionally common knowledge that loop tiling results in better locality when the same memory locations are written and read multiple times during the execution of a tile.

Loop tiling is traditionally performed with respect to tiling hyperplanes. In this example, the tiling hyperplanes used are the trivial (i) and (j) hyperplanes. In the general case, any linearly independent combination of hyperplanes may be used for tiling, provided it does not violate program semantics. For example, (i+j) and (i+2*j) could as well be used and the resulting program would be much more complex.

Another important loop transformation is loop skewing. It is common knowledge that loop permutability combined with loop skewing results in the production of parallelism. In the following permutable loops, the inner loop can be executed in parallel after loop skewing:

```
int i,j a[100][100], b[100][100];
for (i = 0; i < 100; i++) {
    for (j = 0; j < 100; j++) {
        a[i+1][j+1] = a[i][j] + a[i][j+1];
    }
}
```

After loop skewing the code is the following and the inner loop j is marked for parallel execution:

```
int i,j a[100][100], b[100][100];
for (i = 0; i < 197; i++) {
    doall (j = max(0, i-98); j <= min(98,i); j++) {
        a[i+1-j][j+1] = a[i-j][j] + a[i-j][j+1];
    }
}
```

The skewing transformation helps extract parallelism at the inner level when the loops are permutable. It is also common knowledge that loop tiling and loop skewing can be combined to form parallel tiles that increase the amount of parallelism and decrease the frequency of synchronizations and communications in the program.

The problem of jointly optimizing parallelism and locality by means of loop fusion, parallelism, loop permutability, loop tiling and loop skewing is a non-trivial tradeoff. It is one of the further objects of this invention to jointly optimize this tradeoff.

When considering high-level loop transformations, it is common practice to represent dependences in the form of affine relations. The first step is to assign to each statement in the program an iteration space and an iteration vector. Consider the program composed of the 2 loops below:

```
for (i = 1; i <= n; i++) {
    for (j = 1 ; j <= n; j++) {
        a[i][j] = a[i][-1 + j] + a[j][i];   // statement S
    }
}
```

The iteration domain of the statement S is D={[i, j] in Z2|1≤i≤n, 1≤j≤n}. The second step is to identify when two operations may be executed in parallel or when a producer consumer relationship prevents parallelism. This is done by identifying the set of dependences in the program. In this example, the set of dependences is: R={[[i, j], [i', j']]|i=i', j=j'−1, [i, j] in D, [i', j'] in D, <S, [i, j]><<<S, [i', j']>} union {[[i, j], [i', j']]|i=j', i=j', [i, j] in D, [i', j'] in D, <S, [i, j]><<<S, [i', j']>}, where << denoted multi-dimensional lexicographic ordering. This relationship can be rewritten as: a[i,j] a[j,i] {([i, j], [j, i])|1≤j, i≤n, −j+i−1≥0} union a[i,j] a[i,j−1] {([i, j+1], [i, j])|1≤j≤n−1, 0≤i≤n}.

It is common practice to represent the dependence relations using a directed dependence graph, whose nodes represent the statements in the program and whose edges represent the dependence relations. In the previous example, the dependence graph has 1 node and 2 edges. It is common practice to decompose the dependence graph in strongly connected components. Usually, strongly connected components represent loops whose semantics require them to be fused in the optimized code. There are many possible cases however and one of the objects of this invention is also to perform the selective tradeoff of which loops to fuse at which depth. It is common knowledge that a strongly connected component of a graph is a maximal set of nodes that can be reached from any node of the set when following the directed edges in the graph.

One-Dimensional Affine Fusion

One embodiment incorporates fusion objectives into affine scheduling constraints. Affine fusion, as used herein means not just merging two adjacent loop bodies together into the same loop nests, but also include loop shifting, loop scaling, loop reversal, loop interchange and loop skewing transformations. In the α/β/γ convention this means that we would like to have the ability to modify the linear part of the schedule, α, instead of just β and γ. Previous fusion works are mostly concerned with adjusting the β component (fusion only) and sometimes both the β and γ components (fusion with loop shifting). One embodiment of the invention, computes a scheduling function used to assign a partial execution order between the iterations of the operations of the optimized program and to produce the resulting optimized code respecting this partial order.

| Fusion example. |
|---|
| for (int i = 0; i <= N; i++) {<br>  for (int j = 0; j <= M; j++) {<br>    A[i][j] = f(C[-2 + i][1 + j]);<br>  }<br>  for (int j = 0; j <= M; j++) {<br>    B[i][j] = g(A[i][1 + j], A[i][j], C[-1 + i][j]);<br>  }<br>  for (int j = 0; j <= M; j++) {<br>    C[i][j] = h(B[i][j], A[i][2 + j], A[i][1 + j]);<br>  }<br>} |

As a simple motivational example demonstrating the power of affine fusion, consider the example above. Dependencies between the loop nests prevents the loops from being fused directly, unless loop shifting is used to peel extra iterations of the first and second loops. The resulting transformation is shown below.

| Result of fusion by shifting. |
|---|
| if (M >= 0) {<br>  for (int i = 0; i <= N; i++) {<br>    for (int j = -2; j <= min(M + -2, -1); j++) {<br>      A[i][2 + j] = f(C[-2 + i][3 + j]);<br>    }<br>    for (int j = 0; j <= M + -2; j++) {<br>      A[i][2 + j] = f (C[-2 + i][3 + j]);<br>      B[i][j] = g(A[i][1 + j], A[i][j], C[-1 + i][j]);<br>      C[i][j] = h(B[i][j], A[i][2 + j], A[i][1 + j]);<br>    }<br>    for (int j = max(0, M + -1); j <= M; j++) {<br>      B[i][j] = g(A[i][1 + j], A[i][j], C[-1 + i][j]);<br>      C[i][j] = h(B[i][j], A[i][2 + j], A[i][1 + j]);<br>    }<br>  }<br>} |

On the other hand, affine fusion gives a superior transformation, as shown above. In this transformation, the fusion-preventing dependencies between the loop nests are broken with a loop reversal rather than loop shifting, and as a result, no prologue and epilogue code is required. Furthermore, the two resulting loop nests are permutable. Thus we can further apply tiling and extract one degree of parallelism out of the resulting loop nests.

| Result of affine fusion. |
|---|
| if (M >= 0) {<br>  for (int i = 0; i <= N; i++) /* perm=0 */ {<br>    for (int j = - - M; j <= 0; j++) /* perm=0 */ {<br>      A[i][ - j] = f(C[-2 + i][1 - j]);<br>      B[i][ - j] = g(A[i][1 - j], A[i][ - j], C[-1 + i][ - j]);<br>      C[i][ - j] = h(B[i][ - j], A[i][2 - j], A[i][1 - j]);<br>    }<br>  }<br>} |

Many prior art algorithms cannot find this transformation with their restrictions. Some of the restrictions prune out the solution space based on loop reversals, and thus these algorithms can only find the loop-shifting based solutions. Another important criteria is that fusion should not be too greedy, i.e., aggressive fusion that destroys parallelism should be avoided. On the other hand, fusion that can substantially improve locality may sometimes be preferred over an extra degree of parallelism, if we already have obtained sufficient degrees of parallelism to fill the hardware resources. For instance, consider the combined matrix multiply example. This transformation is aggressive, and it gives up an additional level of synchronization-free parallelism that may be important on some highly parallel architectures. It is a further object of this invention to properly model the tradeoff between benefits of locality and parallelism for different hardware configurations.

The code below shows the result of applying fusion that does not destroy parallelism. The two inner i-loops are fissioned in this transformation, allowing a second level of synchronization-free parallelism.

| Partially fusing two matrix multiplies. |
|---|
| doall (int i = 0; i <= n + -i; i++) {<br>  doall (int j = 0; j <= n + -1; j++) {<br>    C[j][i] = 0;<br>    for (int k = 0; k <= n + -1; k++) {<br>      C[j][i] = C[j][i] + A[j][k] * B[k][i];<br>    }<br>  }<br>  doall (int j = 0; j <= n + -1; j++) {<br>    for (int k = 0; k <= n + -1; k++) {<br>      D[j][i] = D[j][i] + C[k][i] * E[j][i];<br>    }<br>  }<br>} |

Affine Fusion Formulation

The tension between fusion and scheduling implies that fusion and scheduling should be solved in a unified manner. For any loop p, we compute a cost $\omega_p$ which measures the slowdown in execution if the loop is executed sequentially rather than in parallel. Similarly, for each pair of loop nests (p, q), we estimate upq the cost in performance if the two loops p and q remains unfused. The cost $\omega_p$ can be interpreted to be the difference between sequential and parallel execution times, and the cost upq can be interpreted as the savings due to cache or communication based locality. In one embodiment, the cost $\omega_p$ is related to a difference in execution speed between sequential operations of the at least one loop on a single execution unit in the second computing apparatus and parallel operations of the at least one loop on more than one of the at least two execution units in the second computing apparatus. In another embodiment, the cost upq is related to a difference in execution speed between operations where the pair of loops are executed together on the second computing apparatus, and where the pair of loops are not executed together on the second computing apparatus.

In an illustrative example, let the Boolean variable $\Delta_p$ denote whether the loop p is executed in sequence, and let the variable fpq denote whether the two loops p and q remain unfused, i.e. $\Delta_p=0$ means that p is executed in parallel, and fpq=0 means that edge loops p and q have been fused. Then by minimizing the weighted sum $$\sum_p w_p \Delta_p + \sum_{p,q} u_{pq} f_{pq}$$

we can optimize the total execution cost pertaining to fusion and parallelism. In some embodiment, the variable $\Delta_p$ specifies if the loop is executed in parallel in the optimized program. In another embodiment, the variable $f_{pq}$ specifies if the pair of loops are executed together in the optimized program.

In some embodiment, the value of the cost $w_p$ is determined by a static evaluation of a model of the execution cost of the instructions in the loop. In another embodiment, the value of the cost $w_p$ is determined through the cost of a dynamic execution on the second computing apparatus of at least a set of instructions representative of the code in the loop. In a further embodiment, the value of the cost $w_p$ is determined by an iterative process consisting of at least one static evaluation of a model of the execution cost and at least one dynamic execution on the second computing apparatus of at least a set of instructions representative of the code in the loop.

In some embodiment, the value of the cost $u_{pq}$ is determined by a static evaluation of a model of the execution cost of the instructions in the loop pair. In another embodiment, the value of the cost $u_{pq}$ is determined through the cost of a dynamic execution on the second computing apparatus of at least a set of instructions representative of the code in the loop pair. In a further embodiment, the value of the cost $u_{pq}$ is determined by an iterative process consisting of at least one static evaluation of a model of the execution cost and at least one dynamic execution on the second computing apparatus of at least a set of instructions representative of the code in the loop pair.

The optimization can be formulated as follows. In one embodiment, we divide up the generalized dependence graph, GDG G=(V, E) into strongly connected components (SCCs) and consider each SCC to be a separate fusible "loop" candidate. Let G'=(V', E') denote the SCC induced subgraph where V' denotes the SCCs and E' the edges between SCCs. Given a node v ∈ V, let sec(v) denote the component in which v belongs to in the SCC decomposition. Given (p, q) E E', let the Boolean variables $f_{pq}$ denote whether two SCCs has been fused, i.e., $f_{pa}=0$ denotes that the loops corresponding to p and q have been fused.

$$f_{pq} \in \{0,1\}, \tag{5}$$

$$(p,q) \in E' \tag{6}$$

There are multiple possible strategies to encode the restrictions implied by E'. In one embodiment, we directly encode the transitivity relation E' as constraints, i.e. (i) given edges (p,q) and (q,r) and (p,q'), if loops (p,q) or (q,1') is not fused then (p,r) cannot be fused, and (ii) if (p, q) and (q, r) are fused then (p, q) must be fused:

$$f_{pq} f_{qr} \leq f_{pr}, (p,q),(q,r),(p,r) \in E' \tag{7}$$

$$f_{pq} + f_{qr} \geq f_{pr}, (p,q),(q,r),(p,r) \in E' \tag{8}$$

One potential deficiency of this strategy is that up to $O(|V'|^3)$ constraints are required. In the second embodiment we adopt, involves the encoding of the β schedule coordinates directly in the constraints. In this encoding, $\beta_p = \beta_q$ implies that loops p and q have been fused:

$$\beta_p \in \{0, |V'|-1\}\, p \in V' \tag{9}$$

$$\beta_p \geq \beta_q + f_{pq} (p,q) \in E' \tag{10}$$

$$\beta_q - \beta_p \geq -|V'| f_{pq}, (p,q) \in E' \tag{11}$$

Given the constraints on $f_{pq}$ in place, we can now provide a suitable modification to the schedule constraints. The constraints are divided into two types, the first involves edges within the same SCC, and the second involves edges crossing different SCCs:

$$\delta_p(y) \geq \phi_{s(e)}(j, y) - \phi_{t(e)}(i, j) \geq 0, \tag{12}$$
$$(i, j) \in R_e(y),$$
$$p = scc(s(e)),$$
$$q = scc(t(e))$$
$$p = q$$

$$\delta_{pq}(y) \geq \phi_{s(e)}(j, y) - \phi_{t(e)}(i, y) \geq -N_\infty F_{pq}(y), \tag{13}$$
$$(i, j) \in R_e(y),$$
$$p = scc(s(e)),$$
$$q = scc(t(e)),$$
$$p \neq q$$

$$F_{pq}(y) = f_{pq}(yl+yk+1) \tag{14}$$

Here, the term $-N_\infty F_{pq}(y)$ is defined in such a way that $-N_\infty F_{pq}(y)=0$ when $f_{pq}=0$, and is equal to a sufficiently large negative function when $f_{pq}=1$. Thus, $\phi_{s(e)}(j,y)-\phi_{t(e)}(i,y) \geq 0$ only needs to hold only if the edge e has been fused or is a loop-carried edge. The final set of constraints is to enforce the restriction that $\delta_p(y)=\delta_q(y)$ if (p, q) has been fused. The constraints encoding this are as follows:

$$\delta_p(y) - \delta_q(y) + N_\infty F_{pq}(y) \geq 0 \ (p,q) \in E' \tag{15}$$

$$\delta_q(y) - \delta_p(y) + N_\infty F_{pq}(y) \geq 0 \ (p,q) \in E' \tag{16}$$

$$\delta_{pq}(y) - \delta_p(y) + N_\infty F_{pq}(y) \geq 0 \ (p,q) \in E' \tag{17}$$

Some embodiments additionally specify that a schedule dimension at a given depth must be linearly independent from all schedule dimensions already computed. Such an embodiment computes the linear algebraic kernel of the schedule dimensions found so far. In such an embodiment, for a given statement S, h denotes the linear part of φS, the set of schedule dimensions already found and J denotes a subspace linearly independent of h. A further embodiment derives a set of linear independence constraints that represent the additional Jh≠0 and does not restrict the search to Jh>0. Such linear independence constraints may be used to ensure successive schedule dimensions are linearly independent. In particular, such an embodiment, that does not restrict the search to Jh>0, exhibits an optimization process that can reach any legal multidimensional affine scheduling of the received program including combinations of loop reversal.

In some embodiments the set of conditions preserving semantics is the union of all the constraints of the form $\phi_{s(e)}(j,y) - \phi_{t(e)}(i,y) \geq 0$. In another embodiment, the optimizing search space that encompasses all opportunities in parallelism and locality is the conjunction of all the constraints (5)-(17).

In further embodiments, the set of affine constraints (12) and (13) is linearized using the affine form of Farkas lemma and is based on at least one strongly connected component of the generalized dependence graph.

In other embodiments, the constraints of the form (12) are used to enforce dimensions of schedules of loops belonging to the same strongly connected component are permutable.

In further embodiments, the constraints of the form (13) are used to ensure that dimensions of schedules of loops that are not executed together in the optimized program do not influence each other. In such embodiments, the constraints of the form (13) use a large enough constant to ensure that dimensions of schedules of loops that are not executed together in the optimized program do not influence each other.

In some embodiments, the linear weighted sum $$\sum_p w_p \Delta_p + \sum_{p,q} u_{pq} f_{pq}$$

can be optimized directly with the use of an integer linear programming mathematical solver such as Cplex. In other embodiments, a non-linear optimization function such as a convex function may be optimized with the use of a convex solver such as CSDP. Further embodiments may devise non-continuous optimization functions that may be optimized with a parallel satisfiability solver.

Boolean Δ Formulation

The embodiments described so far depend on a term (or multiple terms) δ(y) which bounds the maximal dependence distance. Another embodiment may opt for the following simpler formulation. First, we assign each SCC p in the GDG a Boolean variable $\Delta_p$ where $\Delta_p=0$ means a dependence distance of zero (i.e., parallel), and $\Delta_p=1$ means some non-zero dependence distance:

$$\Delta_p \in \{0,1\} \, p \in V' \quad (18)$$

Define the functions Δp(y) and Δpq(y) as:

$$\Delta_p(y) = \Delta_p \times (y1 + \ldots + yk + 1) \quad (19)$$

$$\Delta_{pq}(y) = \Delta_{pq} \times (y1 + \ldots + yk + 1) \quad (20)$$

Then the affine fusion constraints can be rephrased as follows:

$$N_\infty \Delta_p(y) \geq \phi_{s(e)}(j, y) - \phi_{t(e)}(i, y) \geq 0, \quad (21)$$

$(i, j) \in R_e(y)$,
$p = scc(s(e))$,
$q = scc(t(e))$
if $p = q$ $$N_\infty \Delta_{pq}(y) \geq \phi_{s(e)}(j, y) - \phi_{t(e)}(i, y( \geq -N_\infty F_{pq}(y), \quad (22)$$

$(i, j) \in R_e(y)$,
$p = scc(s(e))$,
$q = scc(t(e))$,
if $p \neq q$ $$F_{pq}(y) = f_{pq}(y1 + \ldots + yk + 1) \quad (23)$$

$$\Delta_p - \Delta_q + f_{pq} \geq 0 \quad (p, q) \in E' \quad (24)$$

$$\Delta_q - \Delta_p + f_{pq} \geq 0 \quad (p, q) \in E' \quad (25)$$

$$\Delta_{pq} - \Delta_p + f_{pq} \geq 0 \quad (p, q) \in E' \quad (26)$$

Multi-Dimensional Affine Fusion

Figure 10A:
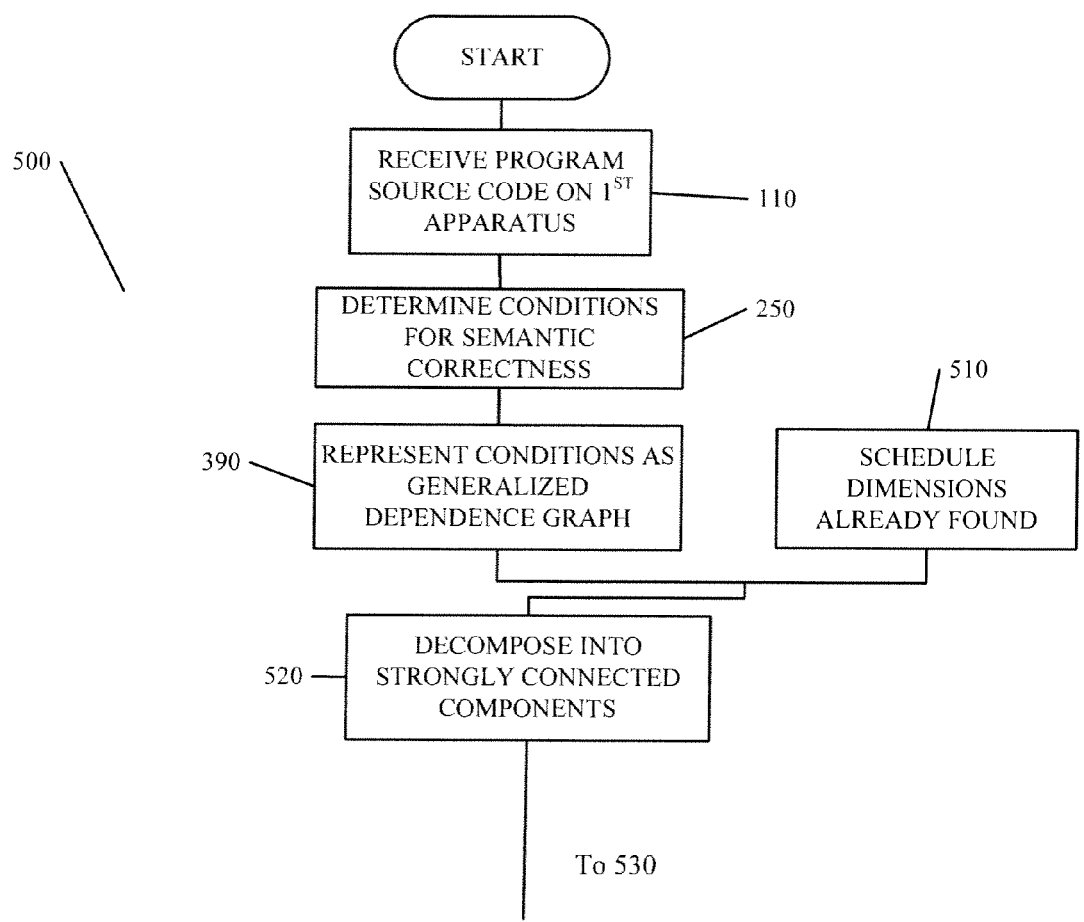
FIGS. 10(a) and 10(b) illustrate an embodiment of a provided method.
Figure 10A:
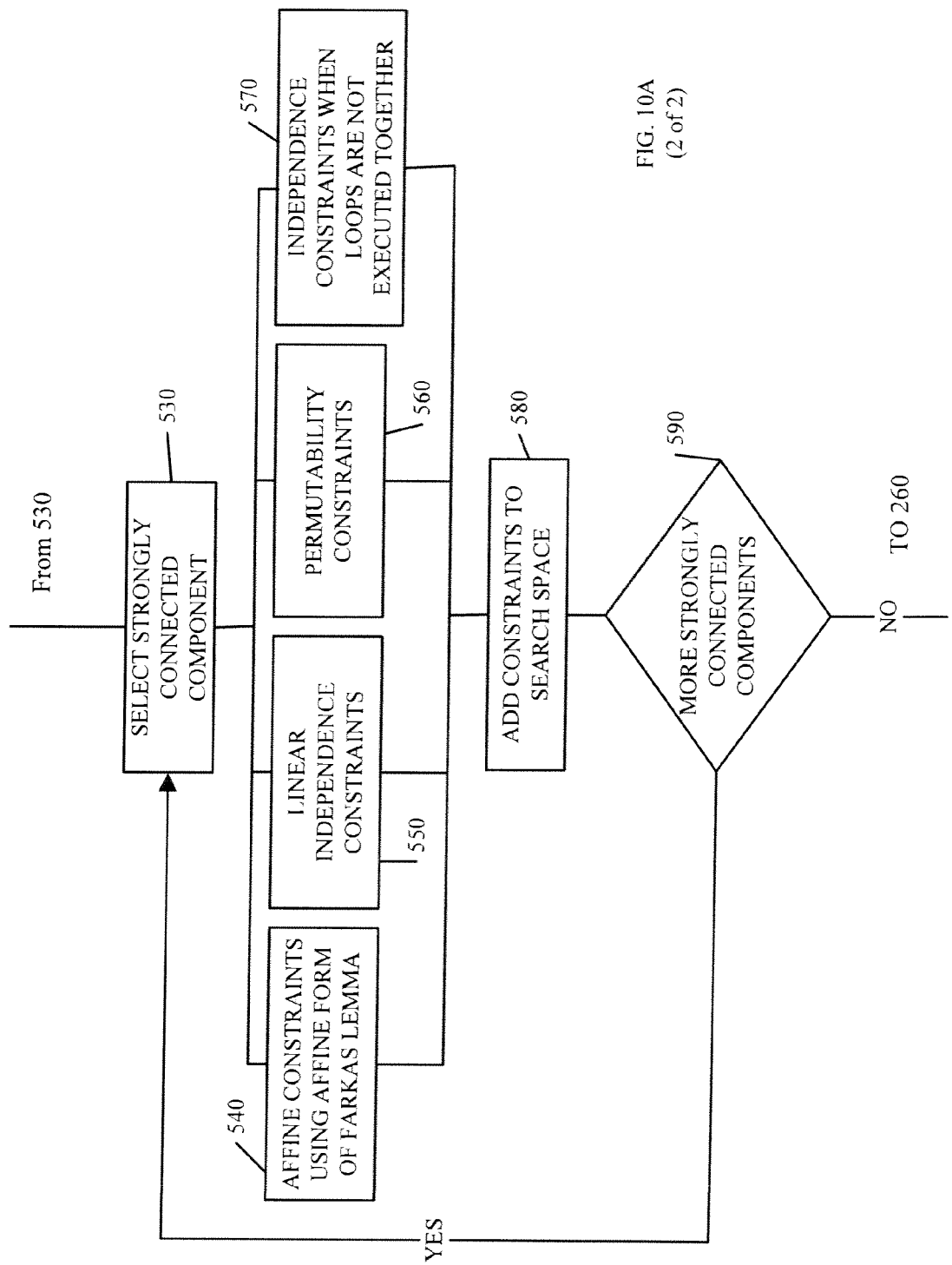
Figure 10B:
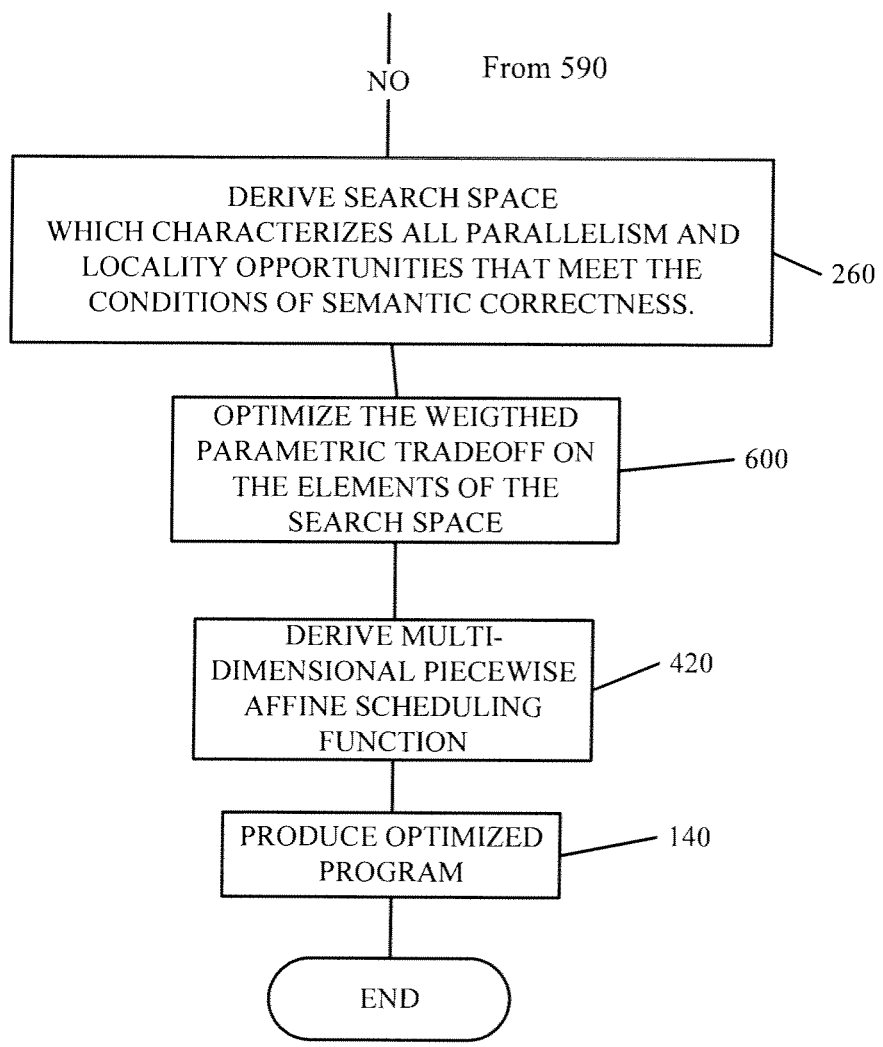
Figure 11:
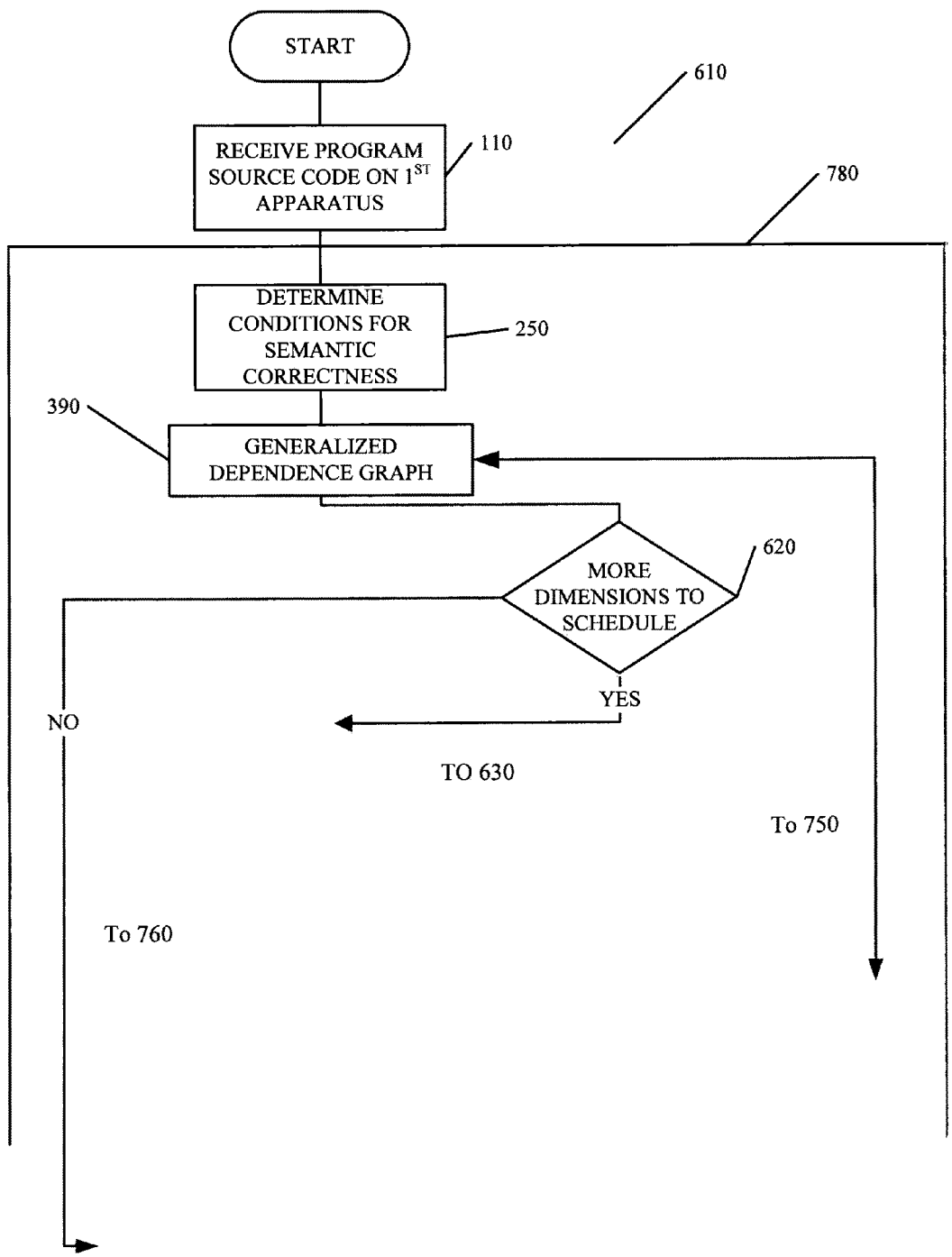
FIG. 11 illustrates an embodiment of a provided method.
Figure 11:
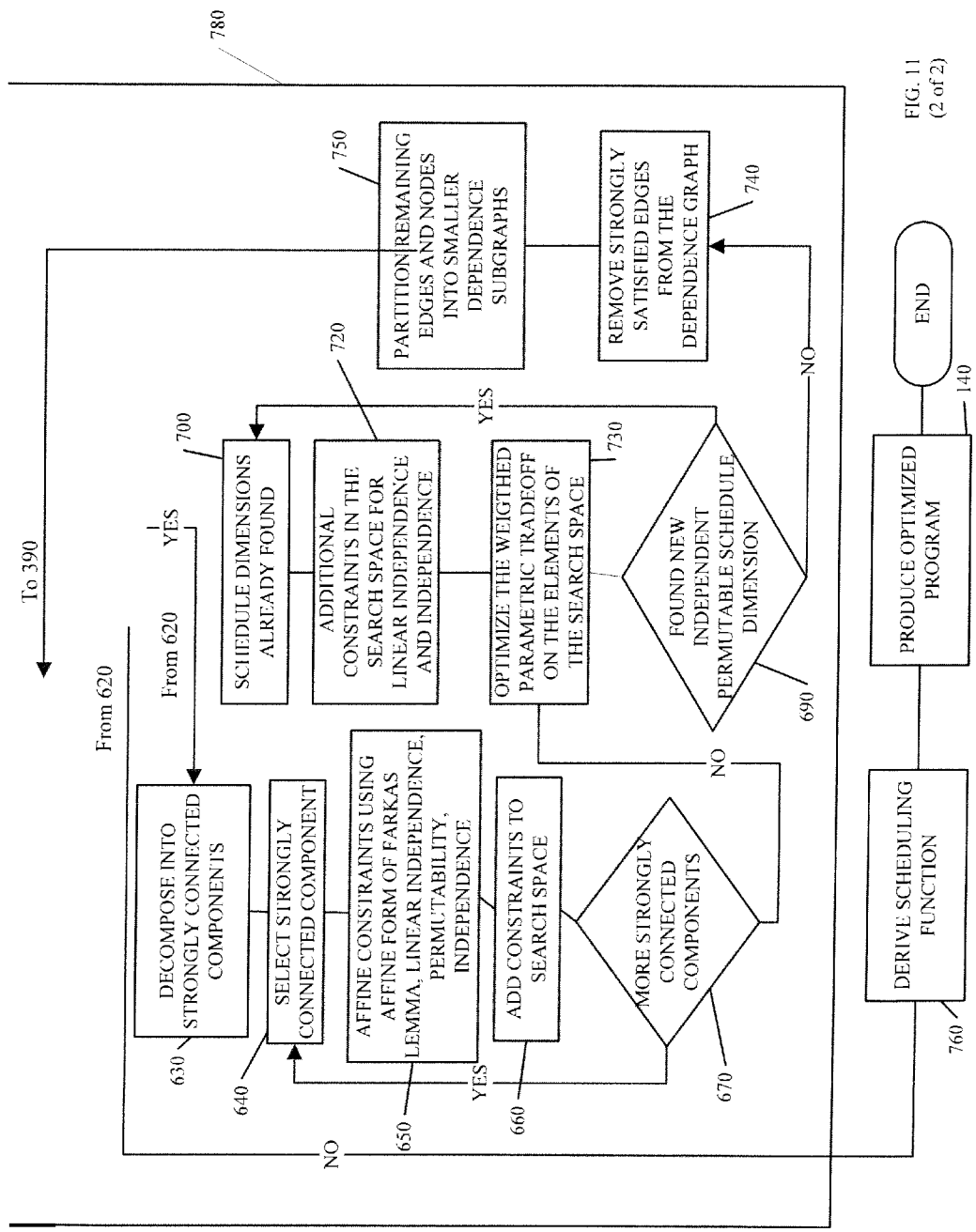
Figure 12A:
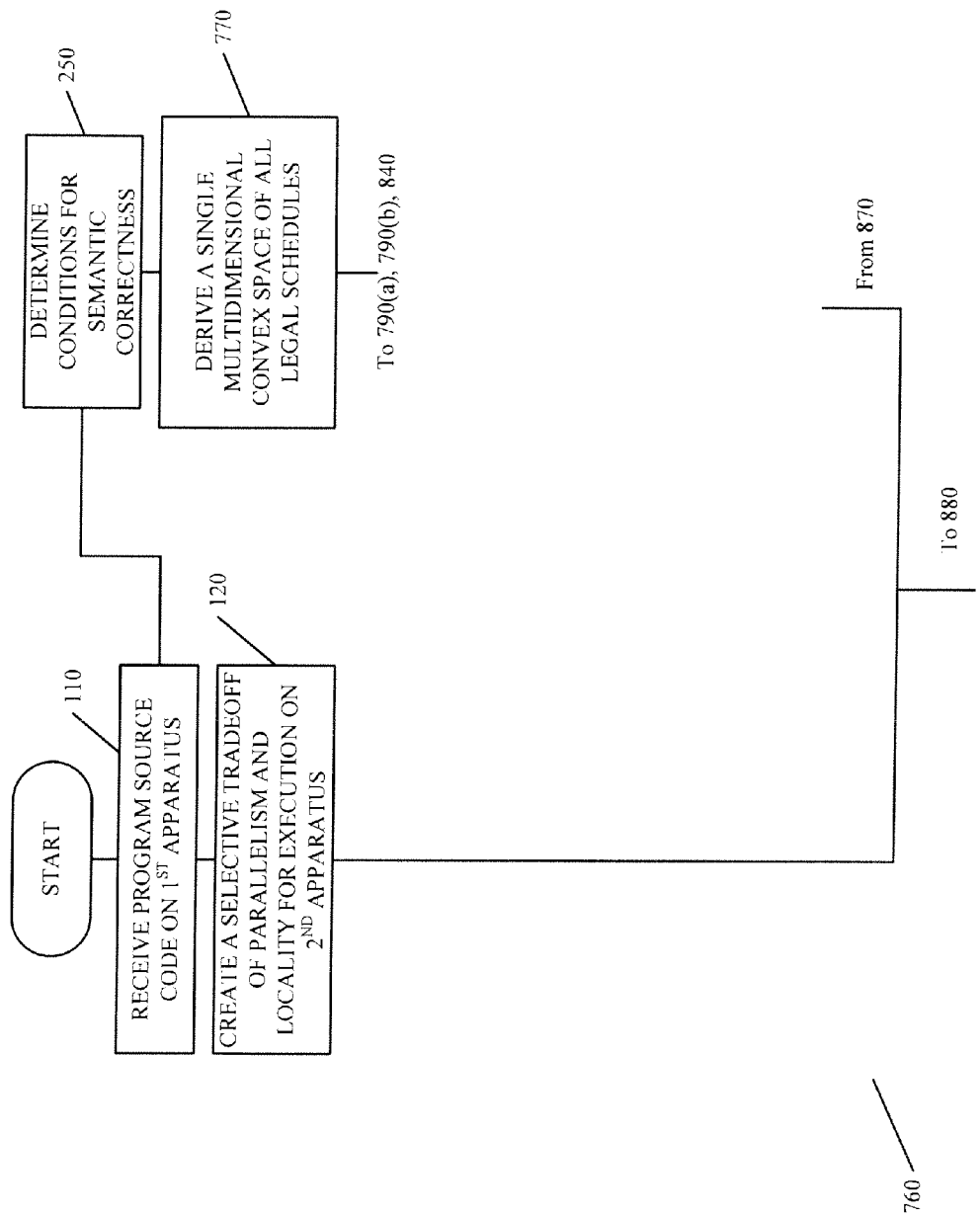
FIGS. 12(a) and 12(b) illustrate an embodiment of a provided method.
Figure 12A:
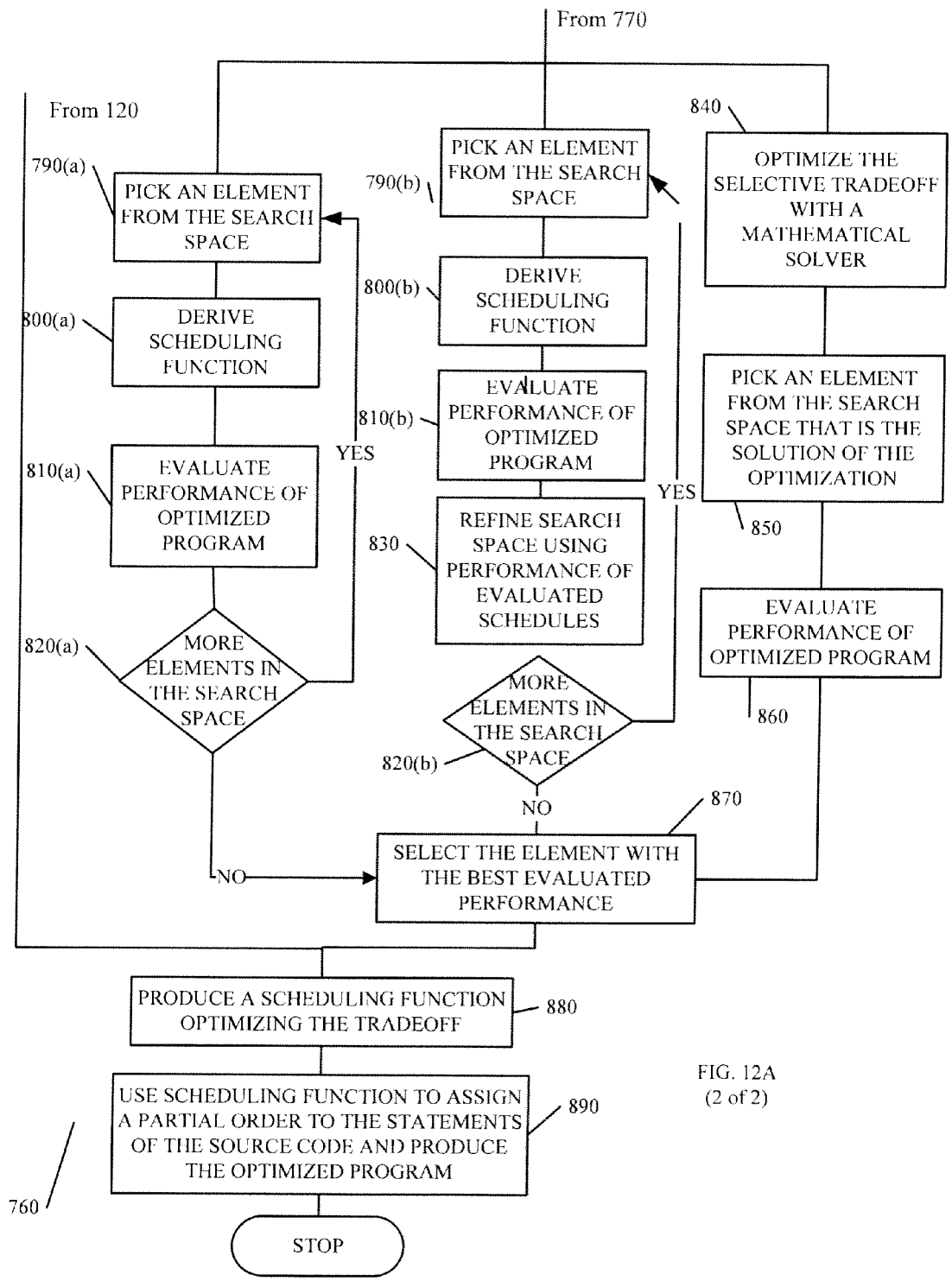
Figure 12B:
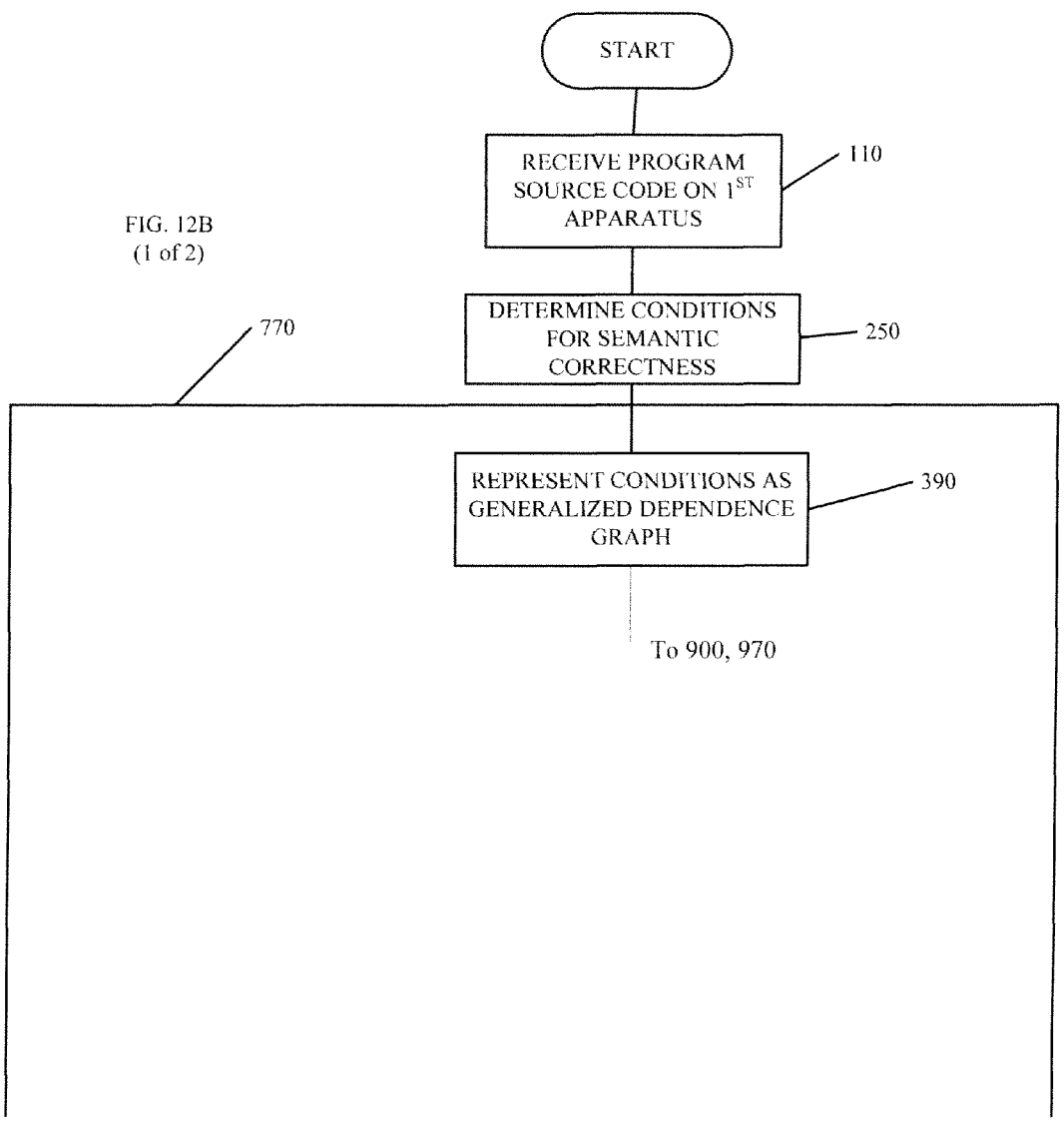
Figure 12B:
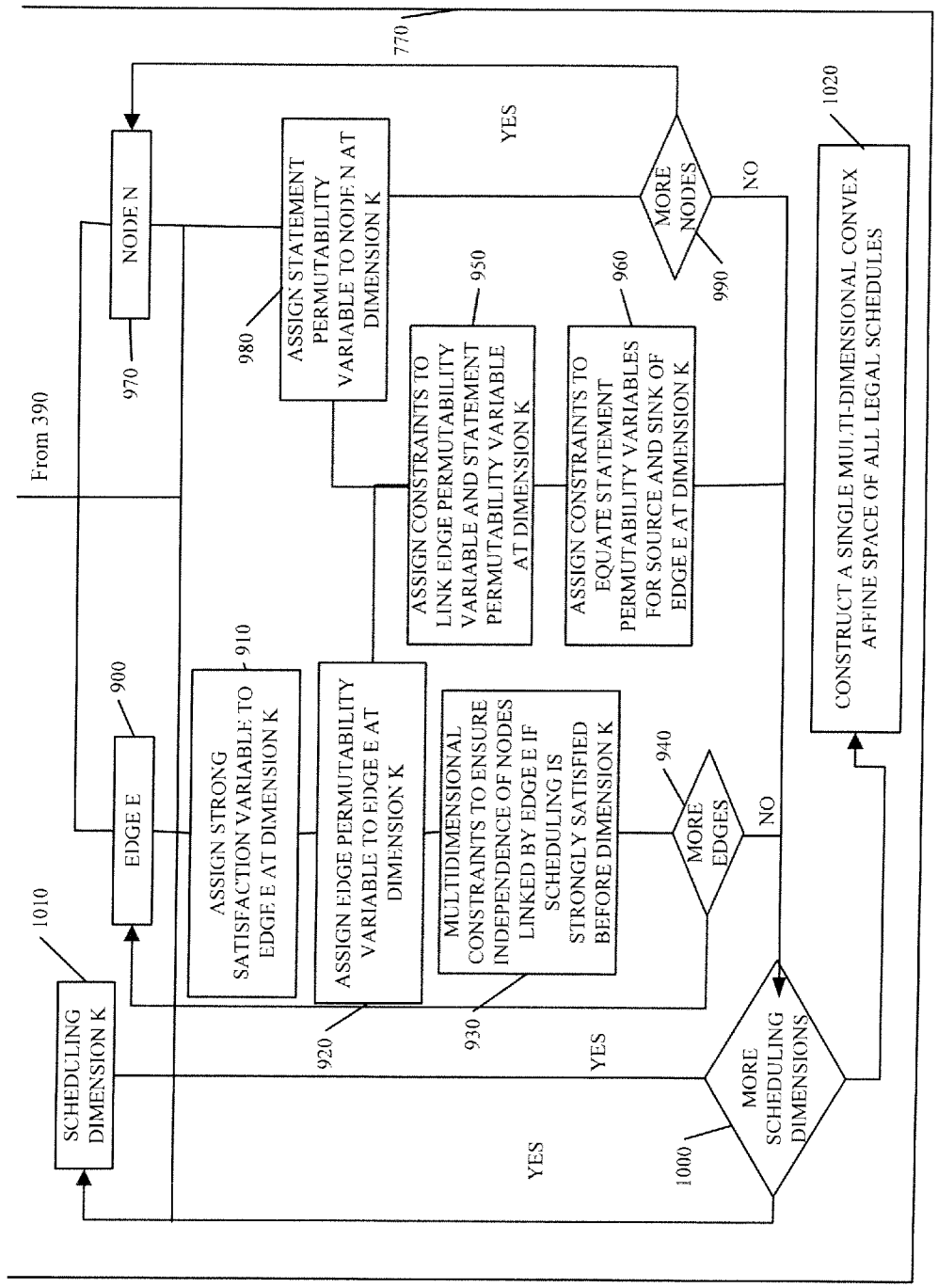
Figure 13:
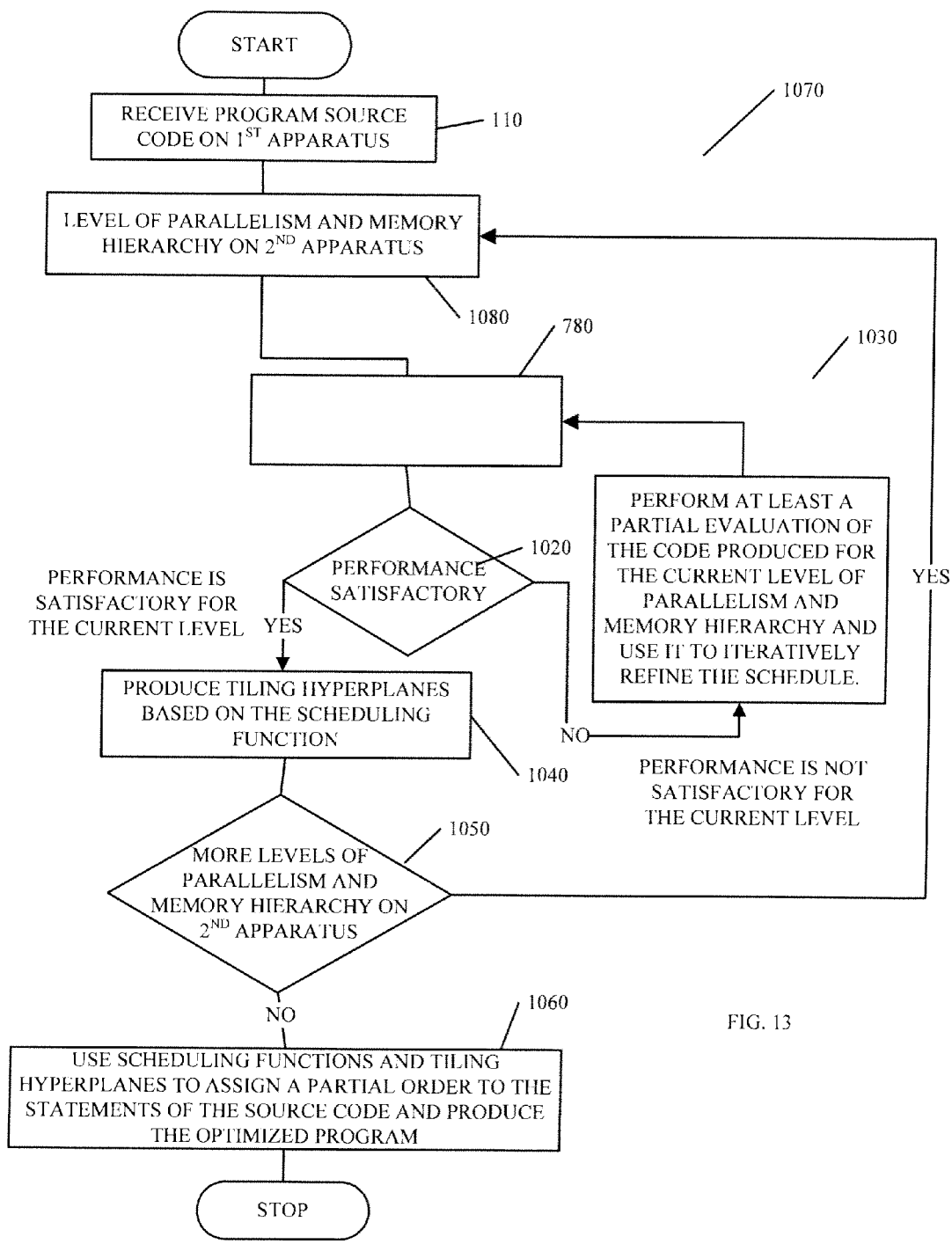
FIG. 13 illustrates an embodiment of a provided method.

Affine fusion formulation is a depth by depth optimization embodiment. A further embodiment described in FIGS. 10(a), 10(b) and 11 shows a method to derive scheduling functions for a given hardware parallelism and memory hierarchy. A further embodiment described in FIG. 13 shows a method to derive scheduling functions for multiple levels of hardware parallelism and memory hierarchies, more specifically by formulating and optimizing at least one global weighted parametric function for each level of the parallelism and memory hierarchy of the second computing apparatus. In a further embodiment, it is a further object of the invention to build a single multi-dimensional affine fusion formulation as an alternative or as a supplement to the depth-by-depth affine fusion formulation. The single multi-dimensional fusion formulation relies on a single multi-dimensional convex affine space. More specifically, an embodiment of such a single multi-dimensional convex affine space assigns variables and relations for loops, loops pairs and dependence edges e at each scheduling dimension k.

The variables and their interpretations are:

$\delta_e^k(y)$—the maximal dependence distance for edge e in dimension k.

$\delta_a^k(y)$—the maximal dependence distance for the loop in which statement a resides, in dimension k. If L is a loop (SCC) in dimension k then for all statements a, b, ∈l, $\delta_a^k(y) = \delta_b^k(y)$.

$\beta_{k_a}$—the strongly connected component index (loop number) in which statement a appears.

$\phi_a^k(i)$—schedule of statement a in dimension k.

$\epsilon_e^k$—equal to 1 if the schedule at dimension k strictly satisfy e, i.e., $\phi_{s(e)}^k(i,y) - \phi_{t(e)}^k(j,y) \geq 1, e \in E$.

$p_e^k$—a Boolean variable, 0 only if $\epsilon_e^{k-1} = \epsilon_e^k = 1$.

$p_a^k$—a Boolean variable, 0 only if the schedules in dimensions k−1 and k are permutable in the loop in which a resides. If a and b belongs to the same loop in dimension k, then $p_a^k = p_b^k$.

$$\delta_e^k(y) \geq \phi_{s(e)}^k(i, y) - \phi_{t(e)}^k(j, y) \geq \epsilon_e^k - N_\infty \left( \sum_{k' < k} \epsilon_e^{k'} \right) \quad (i, j) \in R_e(y) \quad (27)$$

$$\epsilon_e^k \in \{0, 1\} \quad e \in E \quad (28)$$

$$\epsilon_e^e \in \{0\} \quad e \in E \quad (29)$$

The following constraints ensure that $p_e^k = 0$ only if $\epsilon_e^{k-1} = 1$ and $\epsilon_e^k = 1$:

$$p_e^k \in \{0,1\} \, e \in E \quad (30)$$

$$\epsilon_e^{k-1} \epsilon_e^k + 2p_e^k \geq 2, \, e \in E \quad (31)$$

The next constraints encode the β component of the schedules.

$$\beta_e^k \in \{0, |V|-1\} \quad (32)$$

$$\beta_{s(e)}^k - \beta_{t(e)}^k \geq -N_\infty \left( \sum_{k' < k} \epsilon_e^{k'} \right) \quad e \in E \quad (33)$$

The next set of constraints ensures that all $\delta_a^k(y)$ terms are the same for all nodes a which belong to the same loop nest:

$$\delta_s(e)^k(y)-\delta_e^k(y) \leq N_\infty(\beta_s(e)^k-\beta_t(e)^k) \; e \in E \tag{34}$$

$$\delta_e^k(y)-\delta_s(e)^k(y) \leq N_\infty(\beta_s(e)^k-\beta_t(e)^k) \; e \in E \tag{35}$$

$$\delta_t(e)^k(y)-\delta_e^k(y) \leq N_\infty(\beta_s(e)^k-\beta_t(e)^k) \; e \in E \tag{36}$$

$$\delta_e^k(y)-\delta_t(e)^k(y) \leq N_\infty(\beta_s(e)^k-\beta_t(e)^k) \; e \in E \tag{37}$$

$$\delta_s(e)^k(y)-\delta_t(e)^k(y) \leq N_\infty(\beta_s(e)^k-\beta_t(e)^k) \; e \in E \tag{38}$$

$$\delta_t(e)^k(y)-\delta_s(e)^k(y) \leq N_\infty(\beta_s(e)^k-\beta_t(e)^k) \; e \in E \tag{39}$$

Similarly, the next set of constraints ensure that all $p_a^k$ are identical for all nodes a which belong in the same loop nest.

$$p_s(e)^k-p_e^k \leq N_\infty(\beta_s(e)^k-\beta_t(e)^k) \; e \in E \tag{40}$$

$$p_s^k-p_t(e)^k \leq N_\infty(\beta_s(e)^k-\beta_t(e)^k) \; e \in E \tag{41}$$

$$p_s(e)^k-p_t(e)^k \leq N_\infty(\beta_s(e)^k-\beta_t(e)^k) \; e \in E \tag{42}$$

$$p_t(e)^k-p_s(e)^k \leq N_\infty(\beta_s(e)^k-\beta_t(e)^k) \; e \in E \tag{43}$$

In some embodiment, the strong satisfaction variable E_{k,e} assigned to each schedule dimension k and each edge e of the at least one strongly connected component is $\epsilon_e^k$ which is equal to 1 when the schedule difference at dimension k strictly satisfies edge e (i.e. when $\phi_{s(e)}^k(i,y)-\phi_{t(e)}^k(j,y) \geq 1$, e ∈E), 0 otherwise. In other embodiments, the loop permutability Boolean variable p_{k,e} assigned to each schedule dimension and each edge e of the at least one strongly connected component is $p_e^k$.

In a further embodiment the statement permutability Boolean variable p_{k,a} assigned to each schedule dimension and each statement a of the at least one strongly connected component is $p_a^k$. In another embodiment, constraints of the form (27), (28) and (29) are added to ensure dimensions of schedules of statements linked by a dependence edge in the generalized dependence graph do not influence each other at depth k if the dependence has been strongly satisfied up to depth k−1. In a further embodiment, constraints of the form (30) and (31) are added to link the strong satisfiability variables to the corresponding loop permutability Boolean variables. In another embodiment, constraints of the form (34) to (43) are added to ensure statement permutability Boolean variables are equal for all the statements in the same loop nest in the optimized program. In a further embodiment, the conjunction of the previous constraints forms a single multi-dimensional convex affine search space of all legal multi-dimensional schedules that can be traversed exhaustively or using a speeding heuristic to search for schedules to optimize any global cost function.

One example of an embodiment tailored for successive parallelism and locality optimizations is provided for an architecture with coarse grained parallel processors, each of them featuring fine grained parallel execution units such as SIMD vectors. One such architecture is the Intel Pentium E 5300. The following example illustrates how an embodiment of the invention computes schedules used to devise multi-level tiling hyperplanes and how a further embodiment of the invention may compute different schedules for different levels of the parallelism and memory hierarchy of the second computing apparatus. Consider the following code representing a 3-dimensional Jacobi iteration stencil. In a first loop, the array elements A[i][j][k] are computed by a weighted sum of the 7 elements, B[i][j][k], B[i−1][j][k], B[i+1][j][k], B[i][j−1][k], B[i][j+1][k], B[i][j][k−1] and B[i][j][k+1]. In a symmetrical second loop, the array elements B[i][j][k] are computed by a weighted sum of 7 elements of A. The computation is iterated Titer times.

```
for (t=0; t<Titer; t++) {
    for (i=1; i<N-1; i++) {
        for (j=1; j<N-1; j++) {
            for (k=1; k<M-1; k++) {
                A[i][j][k] = C0*B[i][j][k] + C1*(sum(B[...][...][...]));
                // S0(i,j,k);
}}}
    for (i=1; i<N-1; i++) {
        for (j=1; j<N-1; j++) {
            for (k=1; k<M-1; k++) {
                B[i][j][k] = C0*A[i][j][k] + C1*(sum(A[...][...][...]));
                // S1(i,j,k); }}}}
```

When computing a schedule for the first level of parallelism (the multiple cores) our invention may produce the following optimized code in which permutable loops are marked as such.

```
for (i=0; i<=Titer-1 ; i++) /* perm*/ {
    for (j=0; j<=254; j++) /* perm */ {
        for (k=max(j-253, 2*i); k<=min(2*i+254,j+253); k++) /* perm */ {
            for (l=max(2*i, k+-253, j-253); l<=min(j+254, 2*i+255, k+254); l++) /* perm */ {
                if (j<=253 && 2*i-k>=-253 && 2*i-l>=-254) {
                    S0(j+1, k-2*i+1, l-2*i+1);
                }
                if (j>=1 && -2*i+k>=1 && -2*i+l>=1) {
                    S1(j, k-2*i,l-2*i);
}}}}}
```

In this form, the loops have been fused at the innermost level on loop I and the locality is optimized. Loop tiling by tiling factors (16, 8, 8, 1) may be applied to further improve locality and the program would have the following form, where the inner loops m, n, o are permutable.

```
for (i=0; i<=floorDiv(Titer -1, 16); i++) { /* perm*/
    for (j=2*i; j<=min(2*i+17, floorDiv(Titer+126, 8)); j++) { /* perm*/
        for (k=max(2*i, j-16); k <= min(floorDiv(Titer+126, 8), j+16, 2*i+17); k++) { /* perm*/
            for (l=max(16*i, 8*k-127, 8*j-127); l<=min(Titer-1, 8*k+7, 16*i+15, 8*j+7); l++) {
                /* perm*/
                for (m .....) /* perm */
                    for (n .....) /* perm */
                        for (o .....) /* perm */
                            if (condition1) {
                                S0(m,n,o)
                            }
                            if (condition2) {
                                S1(m,n,o); }}}}}}}}
```

Without further optimization, the loops are fused on all loops i,j,k,l,m,n and o. The program does not take advantage of fine grained parallelism on each processor along the loops m, n and o. Our innovation allows the optimization of another selective tradeoff to express maximal innermost parallelism at the expense of fusion. The selective tradeoff gives a much more important cost to parallelism than locality and our innovation may finds a different schedule for the intra-tile loops that result in a program that may display the following pattern:

```
for (i=0; i<=floorDiv(Titer -1, 16); i++) { /* perm */
    for (j=2*i; j<=min(2*i+17, floorDiv(Titer+126, 8)); j++) { /* perm */
        for (k=max(2*i, j-16); k <= min(floorDiv(Titer+126, 8), j+16, 2*i+17); k++) { /* perm */
            for (l=max(16*i, 8*k-127, 8*j-127); l<=min(Titer-1, 8*k+7, 16*i+15, 8*j+7); l++) {
                /* perm */
                if (-8*k+l>=-126) {
                    doall (m = max(0, 16 * j -2 * l); m <= min(16 * j -2 * l + 15, 253); m++) {
                        doall (n = max(0, 16 * k -2 * l); n <= min(16 * k -2 * l + 15, 253); n++) {
                            doall (o = 0; o <= 254; o++) {
                                S0(1 + m,1 + n,1 + o);
                }}}}
                doall (m=max(0, 16*j-2*l-1); m<=min(16*j-2*l+14, 253); m++) {
                    doall (n=max(16*k-2*l-1, 0); n <= min(253, 16*k-2*l+14); n++) {
                        doall (o=0; o<=254; o++) {
                            S1(1 + m,1 + n,1 + o);
                }}}}}}}}
```

The innermost doall dimensions may further be exploited to produce vector like instructions while the outermost permutable loops may be skewed to produce multiple dimensions of coarse grained parallelism.

In a further embodiment, the schedules that produce the innermost doall dimensions may be further used to produce another level of multi-level tiling hyperplanes. The resulting code may have the following structure:

```
for (i=0; i<=floorDiv(Titer -1, 16); i++) { /* perm */
    for (j=2*i; j<=min(2*i+17, floorDiv(Titer+126, 8)); j++) { /* perm */
        for (k=max(2*i, j-16); k <= min(floorDiv(Titer+126, 8), j+16, 2*i+17); k++) {
            /* perm */
            for (l=max(16*i, 8*k-127, 8*j-127); l<=min(Titer-1, 8*k+7, 16*i+15, 8*j+7); l++) {
                /* perm */
                if (-8*k+l>=-126){
                    doall (m ...) {
                        doall(n ...) {
                            doall (o ...) {
                                doall (p ...) {
                                    doall (q ...) {
                                        doall (r ...) {
                                            S0(1 + p,1 + q,1 + r);
                    }}}}}}}
                    doall (m ...) {
                        doall (n ...) {
                            doall(o ...) {
                                doall (p ...) {
                                    doall (q ...) {
                                        doall (r ...) {
                                            S1(1 + p,1 + q,1 + r);
}}}}}}}}}}}
```

In the following example, dependencies between the loop nests prevent the loops from being fused directly, unless loop shifting is used to peel extra iterations off the first and second loops. The resulting transformation is illustrated in the code below.

```
if (M >= 0) {
    for (int i = 0; i <= N; i++) {
        for (int j = -2; j <= min(M + -2, -1); j++) {
            A[i][2 + j] = f(C[-2 + i][3 + j]);
        }
        for (int j = 0; j <= M + -2; j++) {
            A[i][2 + j] = f(C[-2 + i][3 + j]);
            B[i][j] = g(A[i][1 + j], A[i][j], C[-1 + i][j]);
            C[i] [j] = h(B[i][j], A[i][2 + j], A[i][1 + j]);
        }
        for (int j = max(O, M + -1); j <= M; j++) {
            B[i] [j] = g(A[i] [1 + j], A[i][j], C[-1 + i][j]);
```

-continued

```
            C[i] [j] = h(B[i] [j], A[i] [2 + j], A[i] [1 + j]);
}}}
```

On the other hand, affine fusion (i.e., fusion combined with other affine transformations) gives a superior transformation, as shown below. In this transformation, the fusion-preventing dependencies between the loop nests are broken with a loop reversal rather than loop shifting, and as a result, no prologue or epilogue code is required. Furthermore, the two resulting loop nests are permutable. In some embodiments, tiling and extraction of one degree of parallelism out of the resulting loop nests is performed.

```
if (M >= 0) {
    for (int i = 0; i <= N; i++) { ll permutable
        for (int j = - M; j <= 0; j++) { ll permutable
            A[i] [ - j] f(C[-2 + i][1 - j]);
            B[i][ - j] g(A[i][1 - j], A[i][ - j], C[-1 + i][ - j]);
            C[i] [j] h(B[i] [ - j], A[i] [2 j], A[i] [1 - j]);
}}}
```

In some embodiments loop fusion is limited to not be too greedy, i.e., aggressive fusion that destroys parallelism should be avoided. On the other hand, fusion that can substantially improve locality may sometimes be preferred over an extra degree of parallelism, if we already have; obtained sufficient degrees of parallelism to exploit the hardware resources. For example, given the following code:

```
for (int i = 0; 1 <= -1 + n; i++){
    for (int j = 0; j <= -1+n j++) {
        C[i] [j] = 0; }}
for (int i = 0; i <= -1 + n; i++) {
    for (int j = 0; j <= -1 + n; j++) {
        for (int k 0; k <= -1 + n; k++) {
            C[i] [j] = C[i] [j] + A[i] [k] * B[k] [j];
}}}
for (int i = 0; i <= -1 + n; i++) {
    for (int j = 0; j <= -1 + n; j++) {
        for (int k 0; k <= -1 + n; k++) {
            D[i] [j] = D[i] [j] + C[k] [j] * E[i] [j];
}}}
```

If fusion is applied too aggressively, it gives up an additional level of synchronization-free parallelism.

```
doall (int i = 0; i <= n + -1; i++) {
    for (int j = 0; j <= n + -1; j++) {
        C[j] [i] = 0;
        for (int k = 0; k <= n+-1; k++{
            C[j] [i] = C[j][i] + A[j][k * B[k][i]
        }
        doall (int k = 0; k <= n + -1; k++) {
            D[k] [i] = D[k] [i] + C[j] [i] * E[k] [i] ;
}}}
```

The below code illustrates the result of only applying fusion that does not destroy parallelism. The two inner j-loops are fissioned in this transformation, exposing a second level of synchronization-free parallelism.

```
doall (int i = 0; i <= n + -1; i++) {
    doall (int j = 0; j <= n + -1; j++)
        C[j] [i] = 0;
        for (int k 0; k <= n + -1; k++) {
            C[j] [i] = C[j] [i] + A[j] [k] * B[k] [i];
}}
    doall (int j = 0; j <= n + -1; j++) {
        for (int k 0; k <= n + -1; k++) {
            D[j] [i] = D[j] [i] + C[k] [i] * E [j] [i];
}}}
```

Figure 4:
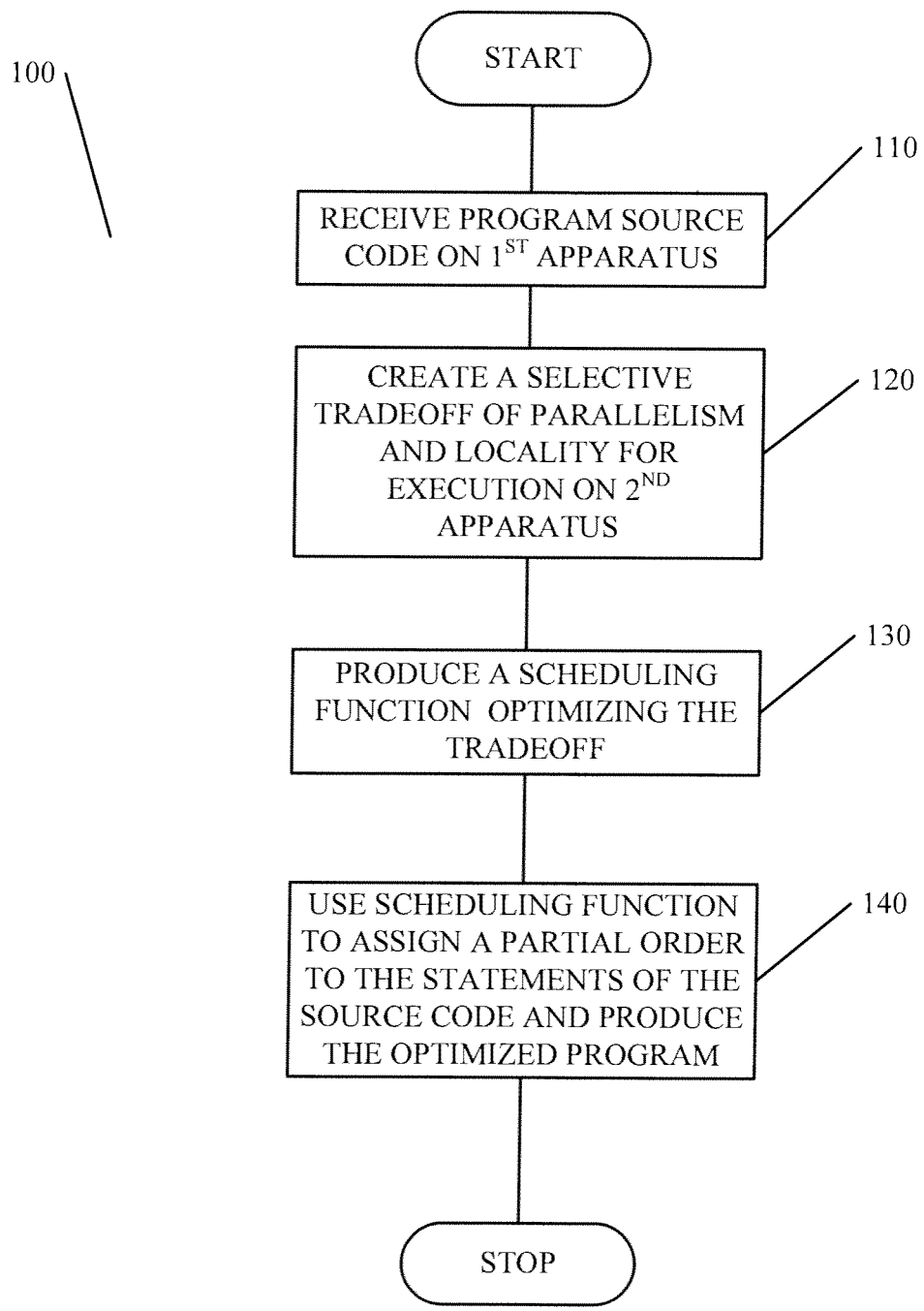
FIG. 4 illustrates an embodiment of a provided method

The above illustrates that this tension between fusion and scheduling implies that fusion and scheduling should be solved in a unified manner. Turning now to FIG. 4 where the flow of provided method 100 of source code optimization is illustrated. Flow begins in block 110 where source code is received in memory 50 on a custom first computing apparatus 10(a). Flow continues to block 120 where a selective tradeoff of parallelism and locality is created for execution of the code on the second computing apparatus 10(b). Flow then continues to block 130 where a scheduling function is produced which optimizes the selective tradeoff. Flow then continues to block 140 where the scheduling function is used to assign a partial order to the statements of the source code and an optimized program is produced for execution on the second computing apparatus 10(b). In one embodiment, the received program code contains at least one arbitrary loop nest. As previously discussed the custom first computing apparatus 10(a) contains memory 50, a storage medium 60 and at least one processor with a multi-stage execution unit.

Figure 5:
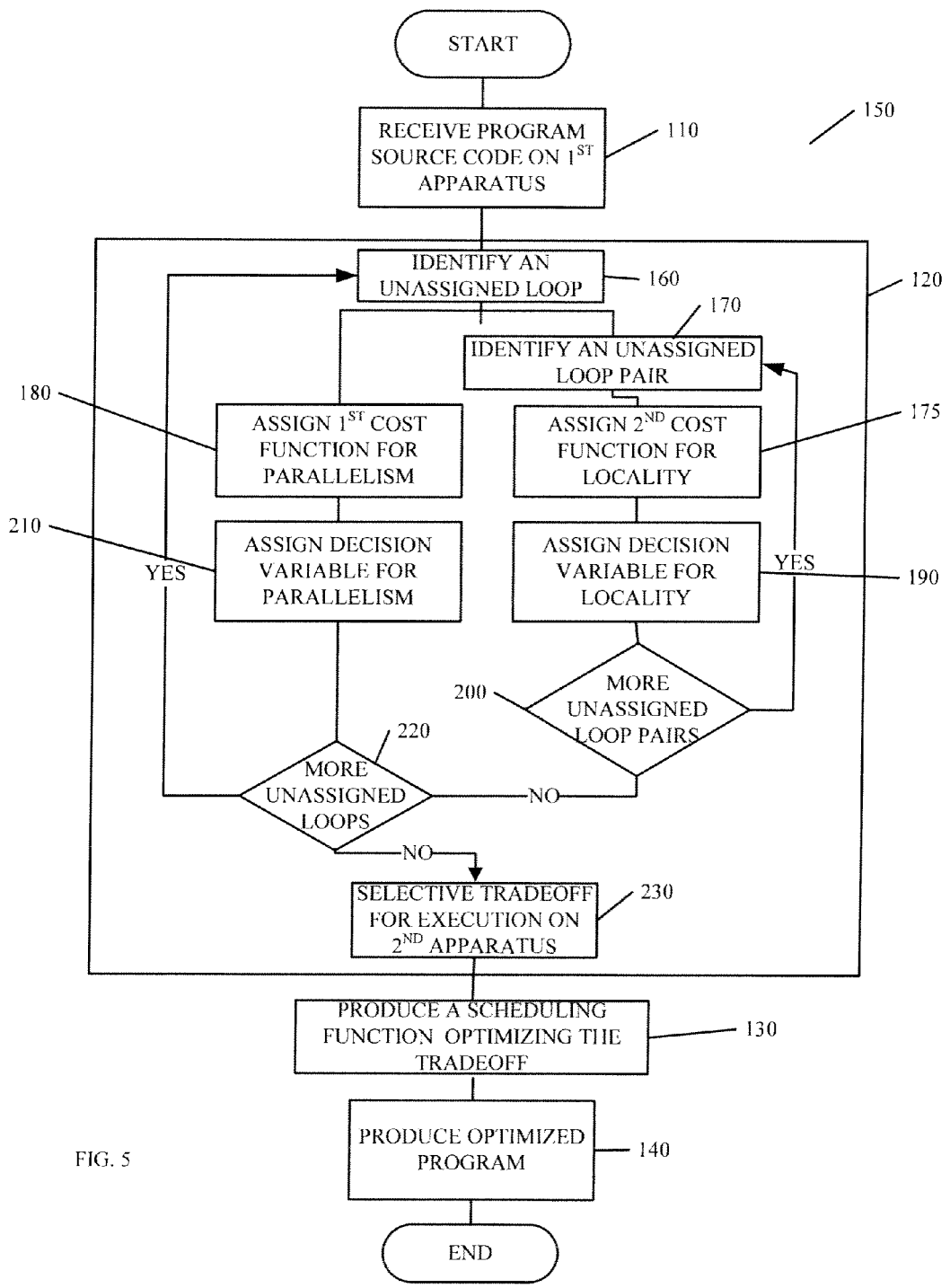
FIG. 5 illustrates an embodiment of a provided method.

A provided method 150 for source code optimization is illustrated in FIG. 5. In this embodiment, flow begins in block 110 where source code is received in memory 50 on a custom first computing apparatus 10(a). Flow continues to block 120 where the code is optimized in terms of both locality and parallelism for execution on a second computing apparatus 10(b). In this embodiment, the optimization block 120 additionally includes additional functional blocks. Within block 120 flow begins with block 160 where an unassigned loop is identified. Flow then continues on two paths. In a first path flow continues to block 180 where a first cost function is assigned in block 180. This first cost function is related to a difference in execution speed between parallel and sequential operations of the statements within the loop on second computing apparatus 10(b). Flow then continues to block 210 where a decision variable is assigned to the loop under consideration, this decision variable indicating whether the loop is to be executed in parallel in the optimized program. In some embodiments the cost is determined through static evaluation of a model of the execution cost of the instructions in the loop under consideration. In other embodiments, the cost is determined through a dynamic execution on the second computing apparatus of at least a set of instructions representative of the code in the loop under consideration. In a further embodiment, the cost is determined by an iterative refining process consisting of at least one static evaluation of a model of the execution cost and at least one dynamic execution on the second computing apparatus of at least a set of instructions representative of the code in the loop under consideration. Flow then continues to decision block 220 where it is determined if there are additional unassigned loops.

As used herein, "executed together" means fused in the sense of the code examples (0032)-(0037). Specifically executed together means that loops that are consecutive in the original program become interleaved in the optimized program. In particular, loops that are not "executed together" in the sense of loop fusion can be executed together on the same processor in the more general sense. In the second optimization path illustrated in FIG. 5 flow continues from block 160 to block 170 where an unassigned loop pair is identified. Flow then continues to block 175 where a second cost function is assigned for locality optimization. This second cost function is related to a difference in execution speed between operations where the loops in the pair of loops are executed together on the second computing apparatus, and where the loops in the pair of loops are not executed together on the second computing apparatus. Flow then continues to block 190 where a decision variable is assigned for locality. This second decision variable specifying if the loops in the loop pair under consideration are to be executed together in the optimized program. In one embodiment, the second cost is determined through static evaluation of a model of the execution cost of the instructions in the at least one loop pair.

In another embodiment, the second cost is determined through of a dynamic execution on the second computing apparatus of at least a set of instructions representative of the code in the at least one loop pair. In a further embodiment, the cost is determined through an iterative refining process consisting of at least one static evaluation of a model of the execution cost and at least one dynamic execution on the second computing apparatus of at least a set of instructions representative of the code in the at least one loop pair. Flow then continues to decision block 200 where it is determined if additional unassigned loop pairs exist. If additional unassigned loop pairs exist, flow continues back to block 170 and the process iterates until no additional unassigned loop pairs are found. When decision block 200 determines no additional loop pairs are present, flow continues to decision block 220. If in decision block 220 it is determined that additional unassigned loops exist, flow continues back to block 160 and the process iterates until no additional unassigned loops may be identified. Flow then continues to block 230 where a selective tradeoff is created for locality and parallelism during the execution on second computing apparatus 10(*b*). Flow then continues to block 130 where a scheduling function is produced that optimizes the selective tradeoff. Flow then continues to block 140 where optimized code is produced.

Figure 6:
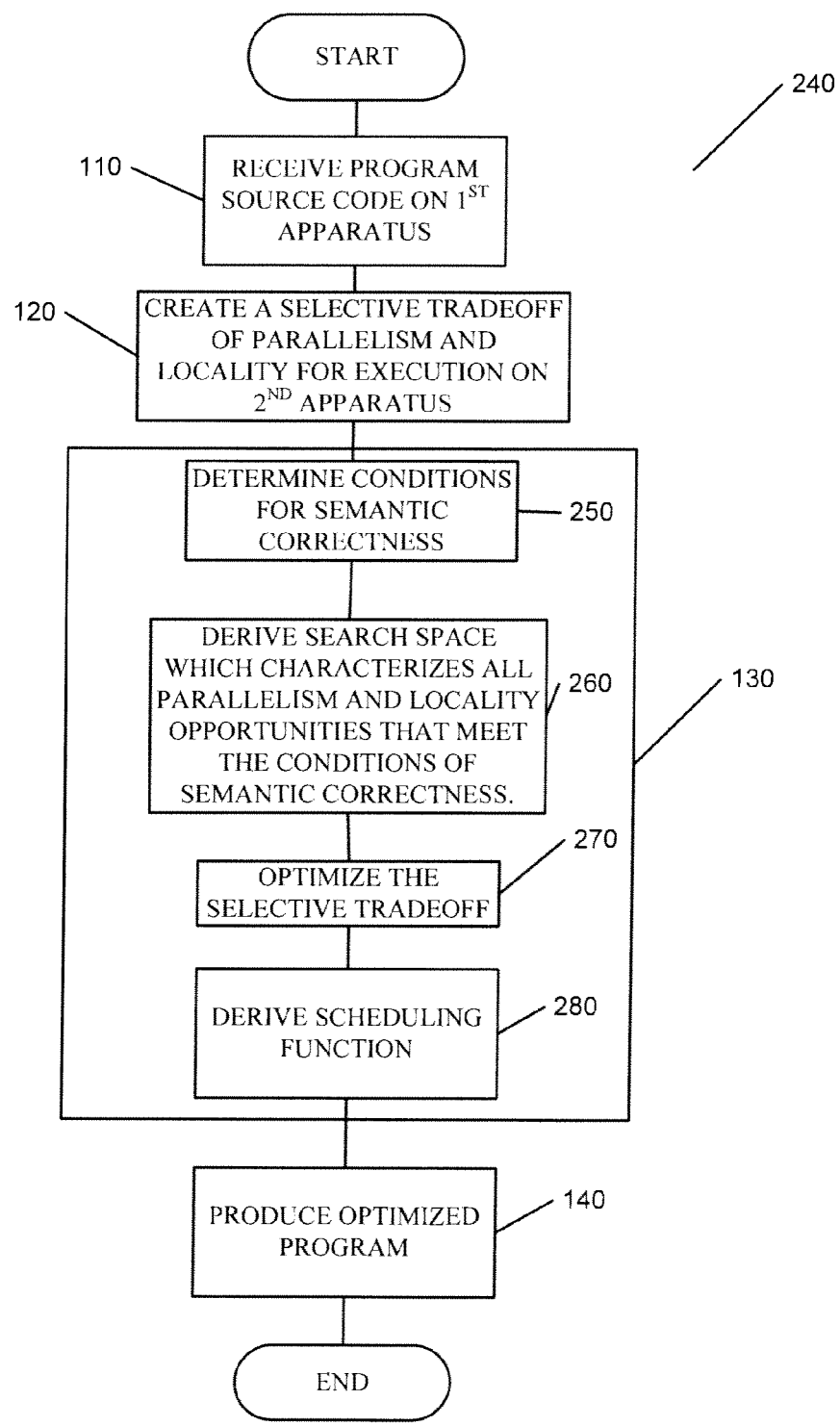
FIG. 6 illustrates an embodiment of a provided method.

The flow of a further provided embodiment of a method 240 for source code optimization is illustrated in FIG. 6. In this embodiment, flow begins in block 110 where source code is received in memory 50 on a custom first computing apparatus 10(*a*). Flow continues to block 120 where the code is optimized in terms of both locality and parallelism for execution on a second computing apparatus 10(*b*). Flow then continues to block 130 where a scheduling function is produced that optimizes the tradeoff. In this embodiment, the scheduling function block 130 additionally includes additional functional blocks. Within block 130 flow continues to block 250 where the conditions for semantic correctness of the program are determined. Flow then continues to block 260 where a search space is derived that meet the conditions for semantic correctness. In one embodiment, the search space characterizes all parallelism and locality opportunities that meet the conditions of semantic correctness. Flow then continues to block 270 where the selective trade off is optimized. Flow then continues to block 280 where the scheduling function is derived from the optimized tradeoff. Flow then continues to block 140 where optimized code is produced.

Figure 7:
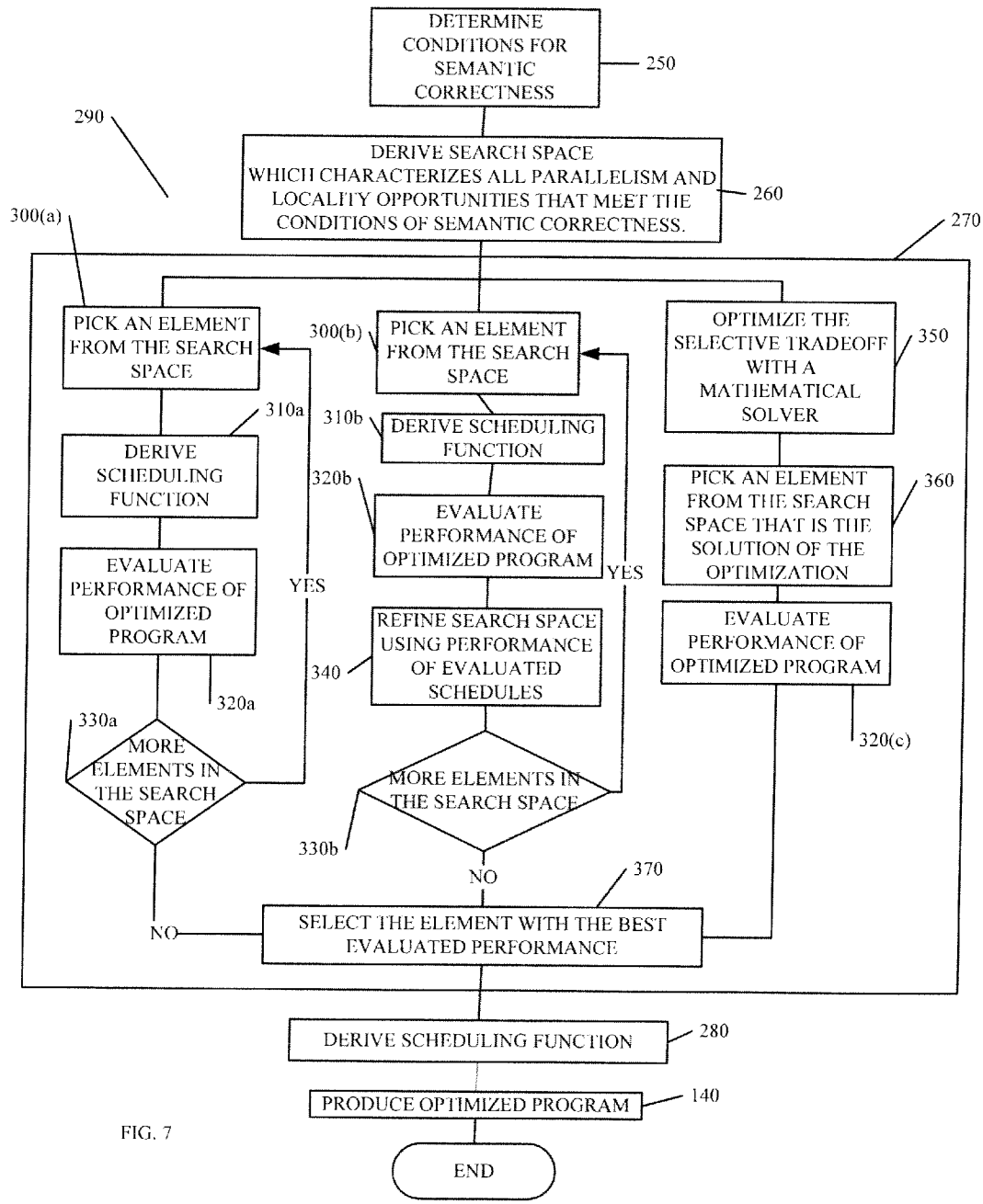
FIG. 7 illustrates an embodiment of a provided method.

The flow of a further provided method is illustrated in FIG. 7. This embodiment illustrates alternate embodiments of the flow within blocks 130 and 270 in previous embodiments. As illustrated, flow begins in block 250 where the conditions for semantic correctness of the program are determined. Flow then continues to block 260 where a search space is derived that meet the conditions for semantic correctness. In one embodiment, the search space characterizes all parallelism and locality opportunities that meet the conditions of semantic correctness. Like previous embodiments, flow then continues to block 270 where the selective trade off is optimized. In these embodiments, block 270 includes additional functionality. Block 270 as illustrated contains three independent optimization paths that may be present in any given embodiment. In the first embodiment, flow begins at block 300(*a*) where an element is selected from the search space. Flow then continues to block 310(*a*) where a potential scheduling function is derived for the element. Flow then continues to block 320(*a*) where the performance of the potential scheduling function is evaluated. Flow then continues to decision block 330(*a*) where it is determined if additional elements exist in the search space. If additional elements exist, flow continues back to block 300(*a*). When no additional elements exist in the search space, flow then continues to block 370 where the element with the best evaluated performance is selected.

In the second illustrated embodiment, flow continues from block 260 to block 300(*b*) where an element is selected from the search space. Flow continues to block 310(*b*) where a potential scheduling function is derived for the element. Flow then continues to block 320(*b*) where the performance of the potential scheduling function is evaluated. Flow then continues to block 340 where the search space is refined using the performance of evaluated schedules. Flow then continues to decision block 330(*b*) where it is determined if additional elements exist in the search space. If additional elements are present flow continues back to block 330 and the process iterated until no other elements exist in the search space. When no additional elements exist, in the search space, flow then continues to block 370 where the element with the best evaluated performance is selected.

In the third illustrated embodiment, flow continues from block 260 to block 350 where the tradeoff is directly optimized in the search space with a mathematical problem solver. Flow then continues to block 360 where an element is selected that is a result of the direct optimization. Flow then continues to block 320(*c*) there the performance of the selected element is evaluated. Flow then continues to block 370 where the element with the best evaluated performance is selected. As illustrated some embodiments may utilize more than one of these paths in arriving at an optimal solution. From selection block 370 flow then continues to block 280 where the scheduling function is derived from the optimized tradeoff. Flow then continues to block 140 where optimized code is produced.

Figure 8:
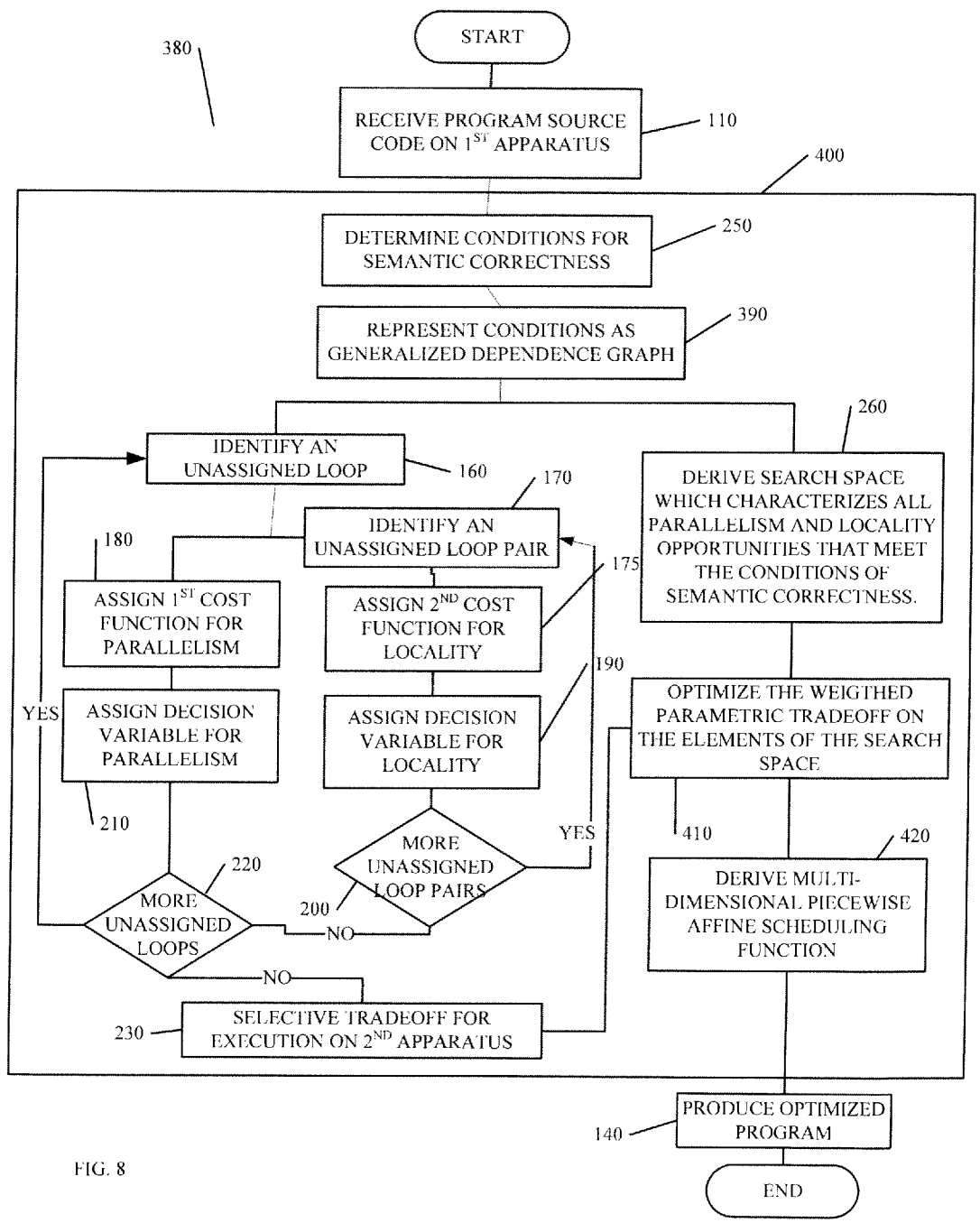
FIG. 8 illustrates an embodiment of a provided method.

The flow of a further provided embodiment of a method 380 for optimization of source code on a first custom computing apparatus 10(*a*) for execution on a second computing apparatus 10(*b*) is illustrated in FIG. 8. In this embodiment, flow begins in block 110 where source code is received in memory 50 on a custom first computing apparatus 10(*a*). Flow continues to block 400 where the source code is optimized in terms of both locality and parallelism for execution on a second computing apparatus 10(*b*). In this embodiment, block 400 contains additional functional blocks. Flow continues from block 110 to block 250 where the conditions for semantic correctness are determined from the received code. Flow then continues to block 390 where these conditions are represented as a generalized dependence graph. Flow then continues to two paths.

On a first path, flow continues to block 260 where a search space is derived that meet the conditions for semantic correctness. In this embodiment, the search space characterizes all parallelism and locality opportunities that meet the conditions of semantic correctness. Flow then continues to block 410 where a weighted parametric tradeoff is derived and optimized on the elements of the search space. On the second path, flow begins with block 160 where an unassigned loop is identified. Flow then continues on two additional paths. In a first path flow continues to block 180 where a first cost function is assigned in block 180. This first cost function is related to a difference in execution speed between parallel and sequential operations of the statements within the unidentified loop on second computing apparatus 10(*b*). Flow then continues to block 210 where a decision variable is assigned to the loop under consideration, this decision variable indicating whether the loop is to be executed in parallel in the optimized program. In some embodiments the cost is determined through static evaluation of a model of the execution cost of the instructions in the loop under consideration. In other embodiments, the cost is determined through a dynamic execution on the second computing apparatus of at least a set of instructions representative of the code in the loop under consideration. In a further embodiment, the cost is determined by an iterative refining process consisting of at least one static evaluation of a model of the execution cost and at least one dynamic execution on the second computing apparatus of at least a set of instructions representative of the code in the loop under consideration. Flow then continues to decision block 220 where it is determined if there are additional unassigned loops.

Returning to block 160 where an unassigned loop is identified. On the second path flow continues to block 170 where an unassigned loop pair is identified. Flow then continues to block 175 where a second cost function is assigned for locality optimization. This second cost function is related to a difference in execution speed between operations where the loops of the pair of loops are executed together on the second computing apparatus, and where the loops of the pair of loops are not executed together on the second computing apparatus. Flow then continues to block 190 where a decision variable is assigned for locality. This second decision variable specifying if the loops of the loop pair under consideration is to be executed together in the optimized program. In one embodiment, the second cost is determined through static evaluation of a model of the execution cost of the instructions in the at least one loop pair. In another embodiment, the second cost is determined through of a dynamic execution on the second computing apparatus of at least a set of instructions representative of the code in the at least one loop pair. In a further embodiment, the cost is determined through an iterative refining process consisting of at least one static evaluation of a model of the execution cost and at least one dynamic execution on the second computing apparatus of at least a set of instructions representative of the code in the at least one loop pair. Flow then continues to decision block 200 where it is determined if additional unassigned loop pairs exist. If additional unassigned loop pairs exist, flow continues back to block 170 and the process iterates until no additional unassigned loop pairs are found. When decision block 200 determines no additional loop pairs are present, flow continues to decision block 220. If in decision block 220 it is determined that additional unassigned loops exist, flow continues back to block 160 and the process iterates until no additional unassigned loops may be identified. Flow then continues to block 230 where a selective trade-off is created for locality and parallelism during the execution on second computing apparatus 10(b).

In this embodiment, flow then continues to block 410 where as discussed, a weighted parametric tradeoff is derived and optimized on the elements of the search space. Flow then continues to block 420 where a multi-dimensional piecewise affine scheduling function is derived that optimizes the code for execution on second computing apparatus 10(b). Flow then continues to block 140 where the optimized program is produced.

Figure 9:
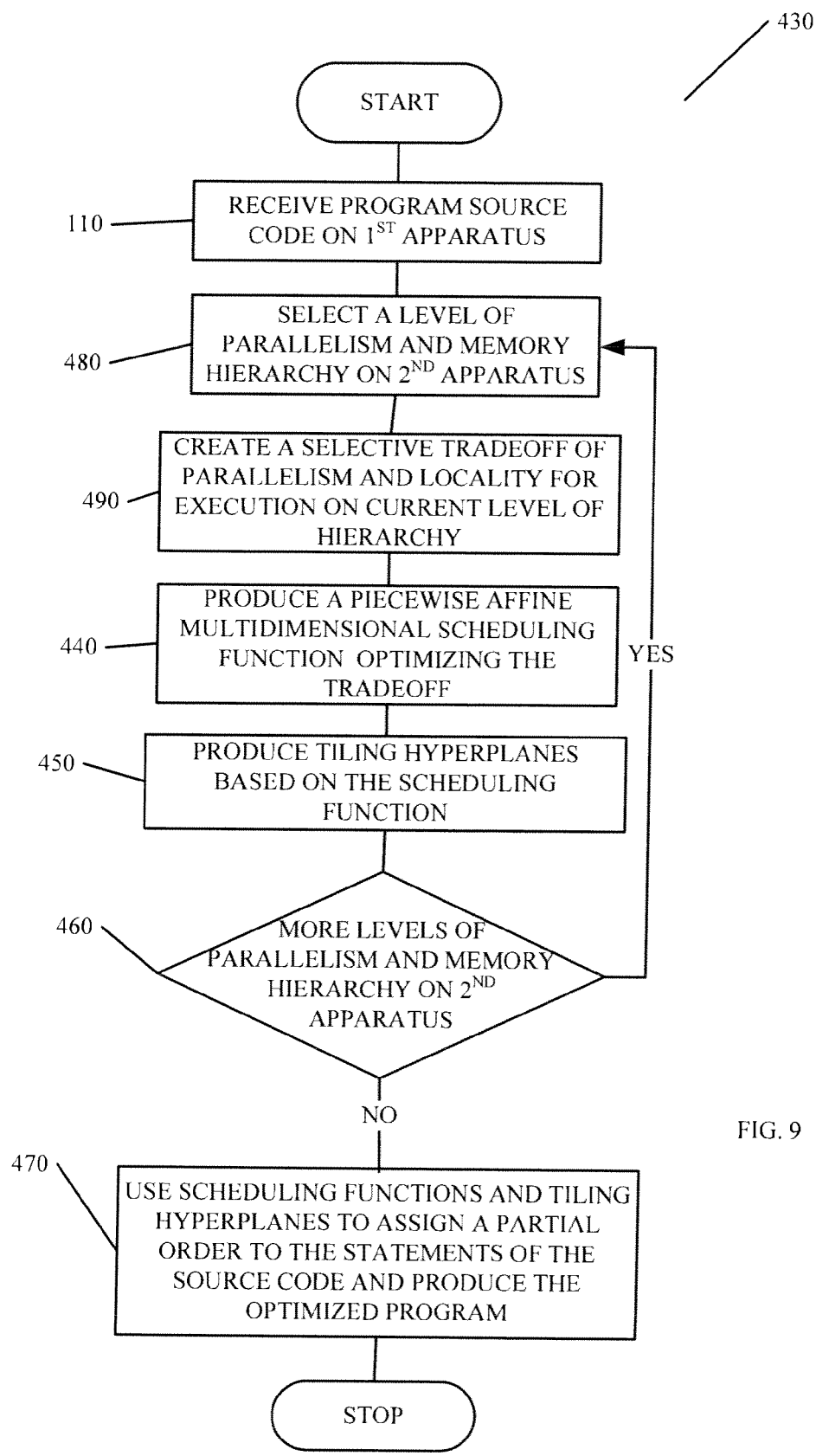
FIG. 9 illustrates an embodiment of a provided method.

The operational flow of a further provided method 430 for source code optimization is illustrated in FIG. 9. In this embodiment, flow begins in block 110 where source code is received in memory 50 on a custom first computing apparatus 10(a). Flow continues to block 480 where the a level of parallelism and memory hierarchy in the second computing apparatus are selected. Flow then continues to block 490 where a selective tradeoff for parallelism and locality for execution of that level of hierarchy is created. Flow then continues to block 440 where a piecewise affine multi-dimensional scheduling function is derived that optimizes the specific tradeoff. Flow then continues to block 450 where tiling hyper-planes are produced based on the scheduling function. Flow then continues to decision block 460 where it is determined if additional levels of parallelism and memory hierarchy exist on second computing apparatus 10(b). If additional levels exist, flow continues back to block 480 and the process iterates until it is determined that no additional levels exist. Flow then continues to block 470 where the scheduling functions and tiling hyper-planes are used to assign a partial order to the statements of the source code and an optimized program is produced. In some embodiments, a global weighted parametric function is used to optimize each level of parallelism and hierarchy on second computing apparatus 10(b).

The operational flow of a further provided method 500 for source code optimization is illustrated in FIGS. 10(a) and 10(b). In this embodiment, flow begins in block 110 where source code is received in memory 50 on a custom first computing apparatus 10(a). Flow continues to block 250 where the conditions for semantic correctness are determined for the program. Flow then continues to block 390 where these conditions are represented as a generalized dependence graph. Alternatively as indicated in block 510 schedule dimensions may have been found through the methods disclosed in other embodiments. Flow continues to block 520 where the generalized dependence graph is decomposed into at least one strongly connected component. Flow then continues to block 530 where a strongly connected component is selected. Flow then continues to a number of independent paths.

In the first path, flow continues to block 540 where a set of affine constraints are derived using the affine form of Farkas lemma. On the second path, flow continues to block 550 where linear independence constraints are derived and used to ensure the successive scheduling dimensions are linearly independent. In some embodiment, these linear independence constraints are derived using orthogonally independent subspaces. In another embodiment, these constraints are formed using a Hermite Normal form decomposition. In the third path, flow continues to block 560 where a set of schedule difference constraints are derived and used to enforce dimensions of schedules of loops belonging to the same strongly connected component are permutable. In the last path, a set of loop independence constraints are derived and used to ensure that dimensions of schedules of loops that are not executed together do not influence each other. In one embodiment, this set of constraints includes a large enough constraint to cancel an effect of constraints on statements that are not executed together in the optimized program.

Flow then continues to block 580 where these derived constraints are added to the search space. Flow then continues to decision block 590 where it is determined if there are additional strongly connected components. If there are additional strongly connected components, flow continues back to block 530 and the process iterates until there are no further strongly connected components. Flow then continues to block 260 where a search space is derived that characterizes all parallelism and locality opportunities that meet the conditions of semantic correctness. Flow then proceeds to block 600 where a weighted parametric tradeoff is optimized on the elements of the search space. Flow continues to block 420 where a multi-dimensional piecewise affine scheduling function is derived from the optimization and to block 140 where this function is used to create an optimized program for execution on second computing apparatus 10(b). In one embodiment, the optimization can reach any legal dimensional affine scheduling of the received program. In another embodiment, the legal multi-dimensional affine scheduling of the received program includes loop reversals.

The operational flow of a further provided method 610 for source code optimization is illustrated in FIG. 11. As with other embodiments, this embodiment may be used in conjunction with other provided methods. In this embodiment, flow begins in block 110 where source code is received in memory 50 on a custom first computing apparatus 10(a). Flow continues to block 780 which contains additional functionality. Flow continues to block 250 where the conditions for semantic correctness are determined for the program. Flow then continues to block 390 where these conditions are represented as a generalized dependence graph. Flow then continues to decision block 620 where it is determined if there are additional dimensions to schedule. If there are no additional dimensions, flow continues to block 760 where a scheduling function is derived and to block 140 where an optimized program is produced for second computing apparatus 10(*b*).

If at decision block 620 determines that there are additional scheduling dimensions, flow continues to block 630 where the generalized dependence graph is decomposed into at least one strongly connected component. Flow continues to block 640 where a strongly connected component is selected. Flow then continues to block 650 where affine constraints are derived using the affine form of Farkas lemma, linear independence constraints permutability constraints, and independence constraints are derived as previously discussed. Flow then continues to block 660 where these constraints are added to the search space. Flow then continues to decision block 670 where it is determined if additional strongly connected components exits. If others exist, flow continues back to 640 and the process iterates until there are no remaining strongly connected components.

When decision block 670 indicates that there are no remaining strongly connected components, flow continues to block 730 where a weighted parametric tradeoff function is optimized on the search space. Flow then continues to decision block 690 where it is determined if new independent permutable schedule dimensions exist. If they exist flow continues to block 700 where an existing scheduling dimension is selected. Flow continues to block 720 where additional constraints are added to the search space for independence and linear independence. From block 720 flow continues to block 730 where a weighted parametric tradeoff function is optimized on the search space. Flow then continues back to decision block 690 and this part of the process iterates until no new independent permutable schedule dimensions are found. Flow then continues to block 740 where satisfied edges are removed from the dependence graph and to block 750 where the remaining edges and nodes are partitioned into smaller dependence graphs. Flow then continues back to block 390 and the process is iterated on these smaller dependence graphs until decision block 620 determines there are no additional dimensions to schedule.

The flow of a further provided embodiment of a method 760 for optimization of source code on a first custom computing apparatus 10(*a*) for execution on a second computing apparatus 10(*b*) is illustrated in FIGS. 12(*a*) and 12(*b*). In this embodiment, flow begins in block 110 where source code is received in memory 50 on a custom first computing apparatus 10(*a*). On a first path flow continues to block 120 where a selective tradeoff of parallelism and locality for execution of the program on second computing apparatus 10(*b*) is created. Flow continues to block 250 where the conditions for semantic correctness are determined. Flow continues to block 770 where a single multi-dimensional convex space of all legal schedules is derived. Additional information on block 770 is provided in FIG. 12(*b*). Like some previous embodiments, flow then continues on alternate three paths. On the first path flow continues to block 790(*a*) where a element from the search space is selected. Flow then continues to block 800(*a*) where a scheduling function is derived for the selected element. Flow then continues to block 810(*a*) where the scheduling function is evaluated for its performance on the optimized program. Flow continues to decision block 820(*a*). If it is determined that there are additional elements in the search space, flow continues back to block 790(*a*) where another element is selected. The process iterates until no additional elements remain in the search space.

On the second path flow continues to block 790(*b*) where an element of the search space is selected. Flow then continues to block 800(*b*) where a scheduling function is derived for the selected element. Flow then continues to block 810(*b*) where the performance of the scheduling function is evaluated. Flow then continues to block 830 where the search space is refined using the performance of evaluated schedules. Flow then continues to decision block 820(*b*). If there are additional elements remaining in the search space flow continues back to block 790(*b*) and another element is selected from the search space. The process iterates until there are no remaining elements in the search space.

On the third path flow continues to block 840 where the selective tradeoff is directly optimized using a mathematical solver. Flow then continues to block 850 where an element is selected from the search space that is a solution to the optimization. Flow then continues to block 860 where the performance of the selected element is evaluated. Flow then continues to block 870 which selects the element with the best evaluated performance for all of its inputs. Flow then continues to block 880 which produces a scheduling function from the selective tradeoff and the selected element. Flow then continues to block 890 where the scheduling function is used to assign a partial order to the statements of the source code and an optimized program is produced.

An exemplary embodiment of block 770 is illustrated in FIG. 12(*b*). In this embodiment, flow from block 250 continues to block 390 where the conditions for semantic correctness are represented as a generalized dependence graph. Flow continues on two parallel paths. On the first path an edge E is selected from the dependence graph in block 900. Flow then continues to block 910 where a strong satisfaction variable is assigned to edge E at dimension K. Block 910 receives the current dimension K from block 1010. Flow then continues to block 930 where multi-dimensional constraints are derived to ensure independence of the nodes linked by edge E if scheduling is satisfied before dimension K. Flow then continues to decision block 940. If there are additional edges in the dependence graph flow continues back to block 900 where another edge is selected and the process iterates until no additional edges exist.

On the second path, flow continues from block 390 to block 970 where a node N is selected. Flow continues to block 980 where a statement permutability variable is assigned to node N at dimension K. Block 980 receives dimension K from block 1010. Flow continues to decision block 990. If there are remaining nodes in the dependence graph flow continues back to block 970 where another node N is selected. The process iterates until no additional nodes exist in the graph. Block 950 receives input from blocks 920 and 980 and assigns constraints to link edge permutability variable and statement permutability variable at dimension K. Flow then continues to block 960 where constraints to equate statement permutability variables for source and sink of edge E at dimension K are assigned. Flow then continues to decision block 1000. If additional scheduling dimensions exist, flow continues back to block 1010 the next scheduling dimension is selected and the entire process repeated for all dimensions. When all dimensions have been scheduled, flow continues to block 1020 where a single multi-dimensional convex affine space is constructed from all of the legal schedules.

The flow of another provided method 1070 for program code optimization is illustrated in FIG. 13. In this method, flow begins in block 110 where program source code is received in memory 50 on a custom first computing apparatus 10(*a*). Flow continues to block 1080 where a level of parallelism and memory hierarchy is selected from the second computing apparatus 10(b). Flow then continues to block 780 which is illustrated in FIG. 11 and discussed in detail above. Flow then continues to decision block 1020. If the performance of the scheduling function is not satisfactory for the current level, flow continues to block 1030 where a partial evaluation of the code produced for the current level of parallelism and memory hierarchy is performed and used to iteratively refine the schedule. Flow continues back to block 780 a iterates until the performance of the schedule is satisfactory for the level. Flow then continues to block 1040 where tiling hyper-planes are produced based on the scheduling function. Flow then continues to decision block 1050. If there are additional levels of parallelism and memory hierarchy flow continues back to block 1080 and the process iterates. Once no additional levels exist, flow continues to block 1060 where the scheduling functions and tiling hyper-planes are used to assign a partial order to the statements of the source code and an optimized program is produced.

Thus, it is seen that methods and an apparatus for optimizing source code on a custom first computing apparatus for execution on a second computing apparatus are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of scheduling the operations of a program on a multi-execution unit computing apparatus, the method comprising:

receiving a computer program in a memory on a first computing apparatus, the first computing apparatus comprising the memory, a storage medium and at least one processor, the at least one processor comprising at least one multi-stage execution unit, the computer program comprising at least one arbitrary loop nest;

optimizing the computer program for execution on a second computing apparatus, the second computing apparatus comprising at least two execution units, the optimization comprising optimizing a selective tradeoff of parallelism and locality costs of operations on the at least two execution units; and producing an optimized computer program for execution on the second computing apparatus, wherein optimizing the selective tradeoff comprises:

assigning a first cost to at least one loop, the at least one loop contained within the at least one arbitrary loop nest, the first cost being related to a difference between execution speeds where operations of the loop are executed in parallel on the second computing apparatus and where the operations of the loop are executed sequentially on the second computing apparatus;

assigning a second cost to at least one pair of loops, the at least one pair of loops contained within the at least one arbitrary loop nest, the second cost being related to a difference between execution speeds where operations of the pair of loops are executed together on the second computing apparatus, and where operations of the pair of loops are not executed together on the second computing apparatus;

assigning each loop within the at least one arbitrary loop nest a first decision variable that specifies if the loop is executed in parallel in the optimized program;

assigning each pair of loops within the at least one arbitrary loop nest a second decision variable that specifies if the loops are executed together in the optimized program; and optimizing a global weighted parametric function of the first cost, the second cost, the first decision variable and the second decision variable;

determining a set of conditions that preserve a semantic correctness of the program;

representing the set of conditions preserving semantic correctness in the form of a generalized dependence graph; and deriving at least one multidimensional piecewise affine function to schedule operations in the optimized program, the multidimensional piecewise affine function optimizing the global weighted parametric function and enforcing the set of conditions for semantic correctness in the optimized program.

2. The method of claim 1, wherein at least one scheduling function is used to schedule operations in the optimized program.

3. The method of claim 2, wherein the at least one scheduling function assigns a partial execution order between the iterations of the operations of the optimized program.

4. The method of claim 1, wherein the optimization further comprises assigning a first cost to at least one loop of the at least one arbitrary loop nest, in the program, the cost related to a difference in execution speed between sequential operations of the at least one loop on a single execution unit in the second computing apparatus and parallel operations of the at least one loop on more than one of the at least two execution units in the second computing apparatus.

5. The method of claim 4, further comprising determining at least one of the cost of the at least one loop through static evaluation of a model of the execution cost of the instructions in the at least one loop.

6. The method of claim 4, further comprising determining at least one of the cost of the at least one loop through the cost of a dynamic execution on the second computing apparatus of at least a set of instructions representative of the code in the at least one loop.

7. The method of claim 4, further comprising determining at least one of the cost of the at least one loop through an iterative refining process consisting of at least one static evaluation of a model of the execution cost and at least one dynamic execution on the second computing apparatus of at least a set of instructions representative of the code in the at least one loop.

8. The method of claim 4, further comprising assigning each loop within the at least one arbitrary loop nest a decision variable that specifies if the loop is executed in parallel in the optimized program.

9. The method of claim 1, further comprising assigning a second cost to at least one pair of loops, the at least one pair of loops contained within the at least one arbitrary loop nest, the cost related to a difference in execution speed between operations where the pair of loops are executed together on the second computing apparatus, and where the pair of loops are not executed together on the second computing apparatus.

10. The method of claim 9, further comprising determining at least one of the cost of the at least one pair through static evaluation of a model of the execution cost of the instructions in the at least one loop pair.

11. The method of claim 9, further comprising determining at least one of the cost of the at least one loop pair through the cost of a dynamic execution on the second computing apparatus of at least a set of instructions representative of the code in the at least one loop pair.

12. The method of claim 9, further comprising determining at least one of the east of the at least one loop pair through an iterative refining process consisting of at least one static evaluation of a model of the execution cost and at least one dynamic execution on the second computing apparatus of at least a set of instructions representative of the code in the at least one loop pair.

13. The method of claim 9, further comprising assigning each pair of loops within the at least one arbitrary loop nest a decision variable that specifies if the loops are executed together in the optimized program.

14. The method of claim 1, further comprising identifying, by the at least one processor in the first computing apparatus and a dependence analysis module, all opportunities in parallelism and locality; the opportunities related to the received program.

15. The method of claim 14, wherein identifying all opportunities in parallelism and locality further comprises determining a set of conditions preserving semantic correctness of the program and deriving an optimizing search space.

16. The method of claim 15, wherein the optimizing search space is traversed to extract a scheduling function optimizing a selective tradeoff of parallelism and locality costs of operations on the at least two execution units.

17. The method of claim 15, further comprising exhaustive traversal of said optimizing search space to extract a scheduling function optimizing a selective tradeoff of parallelism and locality costs of operations on the at least two execution units.

18. The method of claim 15, further comprising iterative heuristic traversal of said optimizing search space to extract a scheduling function optimizing a selective tradeoff of parallelism and locality costs of operations on the at least two execution units.

19. The method of claim 15, further comprising direct optimization, with a mathematical solver, on the optimizing search space to extract a scheduling function optimizing a selective tradeoff of parallelism and locality costs of operations on the at least two execution units.

20. The method of claim 1, further comprising formulating and optimizing at least one global weighted parametric function for each level of the parallelism and memory hierarchy of the second computing apparatus.

21. The method of claim 1, further comprising formulating and optimizing at least one global weighted parametric function for each level of the parallelism and memory hierarchy of the second computing apparatus.

22. The method of claim 1, further comprising decomposing the generalized dependence graph into at least one strongly connected component, the at least one strongly connected component comprising at least one loop.

23. The method of claim 1, further comprising formulating a set of affine constraints by using the affine form of the Farkas lemma, said affine constraints based on at least one strongly connected components of the generalized dependence graph.

24. The method of claim 1, further comprising deriving a set of linear independence constraints; and
    using the linear independence constraints to ensure the successive schedule dimensions are linearly independent.

25. The method of claim 24, wherein said set of linear independence constraints are formed using orthogonally independent subspaces.

26. The method of claim 24, wherein said set of linear independence constraints are formed using a Hermite Normal Form decomposition.

27. The method of claim 1, further comprising:
    deriving a first set of schedule difference constraints; and
    using the first set of schedule difference constraints to enforce dimensions of schedules of loops belonging to the same strongly connected component are permutable.

28. The method of claim 1, further comprising:
    deriving a second set of schedule difference constraints,
    using the said second set of schedule difference constraints to ensure that dimensions of schedules of loops that are not executed together in the optimized program do not influence each other.

29. The method of claim 28, wherein said second set of schedule difference constraints involve a large enough constant to cancel an effect of constraints on statements that are not executed together in the optimized program.

30. The method of claim 1, wherein the optimization can reach any legal multi-dimensional affine scheduling of the received program.

31. The method of claim 30, wherein the legal multi-dimensional affine scheduling of the received program includes combinations of loop reversals.

32. The method of claim 1, wherein one or more of schedule dimensions found by the optimization is used to devise multi-level tiling hyperplanes.

33. The method of claim 1, further comprising:
    (a) decomposing the generalized dependence graph in at least one strongly connected component;
    (b) finding new multi-dimensional schedule dimensions for a strongly connected component from the at least one strongly connected components;
    (c) determining if additional scheduling dimensions exist and when no more multi-dimensional scheduling dimensions can be found in the generalized dependence graph, removing all edges of the generalized dependence graph that are strongly satisfied by the solution in (b);
    (d) partitioning the remaining nodes and edges of the generalized dependence graph into fission loops represented by the induced generalized dependence subgraphs,
    (e) iteratively performing (a) through (d) on each set of constraints induced by the generalized dependence subgraphs until all dimensions have been scheduled.

34. The method of claim 33, further comprising performing the following for each level of parallelism and memory hierarchy of the second computing apparatus:
    finding at least one multi-dimensional schedule using at least one of (a)-(e);
    optimizing the program with the at least one multi-dimensional schedule;

partially evaluating the optimized program resulting from scheduling the received program with the multi-dimensional schedule;

filtering at least one of the generalized dependence subgraph using the partial evaluation of the optimized program and creating a set of partially scheduled generalized dependence subgraphs;

devising multi-dimensional tiles for each partially scheduled generalized dependence subgraph using the at least one multi-dimensional schedule; and repeating the procedure for at least one of the multi-dimensional tiles and ad least one of the filtered partially scheduled generalized dependence subgraphs for the other levels of parallelism and memory hierarchy of the second computing apparatus.

35. The method of claim 1, further comprising constructing a single multi-dimensional convex affine space of all legal schedules of the received program.

36. The method of claim 1, wherein said single multi-dimensional convex affine space of all legal schedules of the received program is used in the optimization process.

37. The method of claim 36, wherein the single multi-dimensional convex affine space of all legal schedules of the received program is traversed using exhaustive search during the optimization process.

38. The method of claim 36, wherein the single multi-dimensional convex affine space of all legal schedules of the received program is traversed using a heuristic driven search during the optimization process.

39. The method of claim 36, wherein said single multi-dimensional convex affine space of all legal schedules of the received program serves as feasible domain to optimize a cost function during the optimization process.

40. The method of claim 36, further comprising assigning a strong satisfaction variable $E\_\{k,e\}$ to each schedule dimension k and each edge e of the at least one strongly connected component, the strong satisfaction variable equal to one when the schedule difference at dimension k strictly satisfies edge e, zero otherwise.

41. The method of claim 36, further comprising assigning a loop permutability Boolean variable $p\_\{k,e\}$ to each schedule dimension k and each edge e of the at least one strongly connected component, said loop permutability Boolean variable equal to zero when $E\_\{k, e\}=E\_\{k-1, e\}=1$, one otherwise.

42. The method of claim 36, further comprising assigning a statement permutability Boolean variable $p\_\{k,a\}$ to each schedule dimension k and statement a of the at least one strongly connected component, the statement permutability Boolean variable equal to zero only if the schedule dimensions k−1 and k are permutable in the loop in which a reside.

43. The method of claim 36, further comprising:
deriving a first set of multi-dimensional schedule difference constraints; and using the first set of multi-dimensional difference constraints to ensure that dimensions of schedules of statements linked by a dependence edge in the generalized dependence graph do not influence each other at depth k if the dependence has been strongly satisfied up to depth k−1.

44. The method of claim 36, further comprising deriving a set of multi-dimensional permutability constraints that link said strong satisfiability variables to corresponding said loop permutability Boolean variables.

45. The method of claim 36, further comprising deriving a set of multi-dimensional constraints that ensure said statement permutability Boolean variables to be equal for all the statements in the same loop nest.

46. A custom computing apparatus comprising:
at least one multi-stage processor;
a memory coupled to the at least one multi-stage processor; and
a storage medium coupled to the memory and the at least one multi-stage processor the storage medium comprising a set of processor executable instructions sufficient that when executed by the at least one multi-stage processor configure the custom computing apparatus to optimize a computer program for execution on a second computing apparatus, the computer program comprising at least one arbitrary loop nest, the second computing apparatus comprising at least two execution units, the configuration comprising a configuration to:
receive a computer program in the memory;
optimize the computer program for execution on the second computing apparatus, the optimization comprising optimizing a selective tradeoff of parallelism and locality costs of operations on the at least two execution units; and
produce an optimized computer program for execution on the second computing apparatus,
wherein the configuration for optimizing the selective tradeoff comprises a configuration to;
assign a first cost to at least one loop, the at least one loop contained within the at least one arbitrary loop nest, the first cost being related to a difference between execution speeds where operations of the loop are executed in parallel on the second computing apparatus, and where the operations of the loop are executed sequentially on the second computing apparatus;
assign a second cost to at least one pair of loops, the at least one pair of loops contained within the at least one arbitrary loop nest, the second cost being related to a difference between execution speeds where operations of the pair of loops are executed together on the second computing apparatus, and where operations of the pair of loops are not executed together on the second computing apparatus;
assign each loop within the at least one arbitrary loop nest a first decision variable that specifies if the loop is executed in parallel in the optimized program;
assign each pair of loops within the at least one arbitrary loop nest a second decision variable that specifies if the loops are executed together in the optimized program; and
optimize a global weighted parametric function of the first cost, the second cost, the first decision variable and the second decision variable;
determine a set of conditions that preserve the semantic correctness of the program;
represent the set of conditions preserving semantic correctness in the form of a generalized dependence graph; and
derive at least one multidimensional piecewise affine function to schedule operations in the optimized program, the multidimensional piecewise affine function optimizing the global weighted parametric function and enforcing the set of conditions for semantic correctness in the optimized program.

47. The custom computing apparatus of claim 46, wherein at least one scheduling function is used to schedule operations in the optimized program.

48. The custom computing apparatus of claim 47, wherein the at least one scheduling function assigns a partial execution order between the iterations of the operations of the optimized program.

49. The custom computing apparatus of claim 46, wherein the optimization further comprises assigning a first cost to at least one loop of the at least one arbitrary loop nest, in the program, the cost related to a difference in execution speed between sequential operations of the at least one loop on a single execution unit in the second computing apparatus and parallel operations of the at least one loop on more than one of the at least two execution units in the second computing apparatus.

50. The custom computing apparatus of claim 49, wherein the configuration further comprises a configuration to determine at least one of the cost of the at least one loop through static evaluation of a model of the execution cost of the instructions in the at least one loop.

51. The custom computing apparatus of claim 49, wherein the configuration further comprises a configuration to determine at least one of the cost of the at least one loop through the cost of a dynamic execution on the second computing apparatus of at least a set of instructions representative of the code in the at least one loop.

52. The custom computing apparatus of claim 49, wherein the configuration further comprises a configuration to determine at least one of the cost of the at least one loop through an iterative refining process consisting of at least one static evaluation of a model of the execution cost and at least one dynamic execution on the second computing apparatus of at least a set of instructions representative of the code in the at least one loop.

53. The custom computing apparatus of claim 49, wherein the configuration further comprises a configuration to assign each loop within the at least one arbitrary loop nest a decision variable that specifies if the loop is executed in parallel in the optimized program.

54. The custom computing apparatus of claim 46, wherein the configuration further comprises a configuration to assign a second cost to at least one pair of loops, the at least one pair of loops contained within the at least one arbitrary loop nest, the cost related to a difference in execution speed between operations where the pair of loops are executed together on the second computing apparatus, and where the pair of loops are not executed together on the second computing apparatus.

55. The custom computing apparatus of claim 54, wherein the configuration further comprises a configuration to determine at least one of the cost of the at least one pair through static evaluation of a model of the execution cost of the instructions in the at least one loop pair.

56. The custom computing apparatus of claim 54, wherein the configuration further comprises a configuration to determine at least one of the cost of the at least one loop pair through the cost of a dynamic execution on the second computing apparatus of at least a set of instructions representative of the code in the at least one loop pair.

57. The custom computing apparatus of claim 54, wherein the configuration further comprises a configuration to determine at least one of the cost of the at least one loop pair through an iterative refining process consisting of at least one static evaluation of a model of the execution cost and at least one dynamic execution on the second computing apparatus of at least a set of instructions representative of the code in the at least one loop pair.

58. The custom computing apparatus of claim 54, wherein the configuration further comprises a configuration to assign each pair of loops within the at least one arbitrary loop nest a decision variable that specifies if the loops are executed together in the optimized program.

59. The custom computing apparatus of claim 46, wherein the configuration further comprises a configuration to identify, by the at least one processor in the first computing apparatus and a dependence analysis module, all opportunities in parallelism and locality; the opportunities related to the received program.

60. The custom computing apparatus of claim 59, wherein the configuration to identify all opportunities in parallelism and locality further comprises a configuration to determine a set of conditions preserving semantic correctness of the program and derive an optimizing search space.

61. The custom computing apparatus of claim 60, wherein configuration further comprises a configuration to traverse the optimizing search space to extract a scheduling function optimizing a selective tradeoff of parallelism and locality costs of operations on the at least two execution units.

62. The custom computing apparatus of claim 60, wherein the configuration further comprises a configuration to perform an exhaustive traversal of said optimizing search space to extract a scheduling function optimizing a selective tradeoff of parallelism and locality costs of operations on the at least two execution units.

63. The custom computing apparatus of claim 60, wherein the configuration further comprises a configuration to perform an iterative heuristic traversal of said optimizing search space to extract a scheduling function optimizing a selective tradeoff of parallelism and locality costs of operations on the at least two execution units.

64. The custom computing apparatus of claim 60, wherein the configuration further comprises a configuration to perform direct optimization, with a mathematical solver, on the optimizing search space to extract a scheduling function optimizing a selective tradeoff of parallelism and locality costs of operations on the at least two execution units.

65. The custom computing apparatus of claim 46, wherein the configuration further comprises a configuration to formulate and optimize at least one global weighted parametric function for each level of the parallelism and memory hierarchy of the second computing apparatus.

66. The custom computing apparatus of claim 46, wherein the configuration further comprises a configuration to formulate and optimize at least one global weighted parametric function for each level of the parallelism and memory hierarchy of the second computing apparatus.

67. The custom computing apparatus of claim 46, wherein the configuration further comprises a configuration to decompose the generalized dependence graph into at least one strongly connected component, the at least one strongly connected component comprising at least one loop.

68. The custom computing apparatus of claim 46, wherein the configuration further comprises a configuration to formulate a set of affine constraints by using the affine form of the Farkas lemma, said affine constraints based on at least one strongly connected components of the generalized dependence graph.

69. The custom computing apparatus of claim 46, wherein the configuration further comprises a configuration to derive a set of linear independence constraints; and
 use the linear independence constraints to ensure the successive schedule dimensions are linearly independent.

70. The custom computing apparatus of claim 69, wherein said set of linear independence constraints are formed using orthogonally independent subspaces.

71. The custom computing apparatus of claim 69, wherein said set of linear independence constraints are formed using a Hermite Normal Form decomposition.

72. The custom computing apparatus of claim 46, wherein the configuration further comprises a configuration to;
 derive a first set of schedule difference constraints; and use the first set of schedule difference constraints to enforce dimensions of schedules of loops belonging to the same strongly connected component are permutable.

73. The custom computing apparatus of claim 46, wherein the configuration further comprises a configuration to:
derive a second set of schedule difference constraints,
use the said second set of schedule difference constraints to ensure that dimensions of schedules of loops that are not executed together in the optimized program do not influence each other.

74. The custom computing apparatus of claim 73, wherein said second set of schedule difference constraints involve a large enough constant to cancel an effect of constraints on statements that are not executed together in the optimized program.

75. The custom computing apparatus of claim 46, wherein the optimization can reach any legal multi-dimensional affine scheduling of the received program.

76. The custom computing apparatus of claim 75, wherein the legal multi-dimensional affine scheduling of the received program includes combinations of loop reversals.

77. The custom computing apparatus of claim 46, wherein one or more of schedule dimensions found by the optimization is used to devise multi-level tiling hyperplanes.

78. The custom computing apparatus of claim 46, wherein the configuration further comprises a configuration to:
(a) decompose the generalized dependence graph in at least one strongly connected component;
(b) find new multi-dimensional schedule dimensions for a strongly connected component from the at least one strongly connected components;
(c) determine if additional scheduling dimensions exist and when no more multi-dimensional scheduling dimensions can be found in the generalized dependence graph, removing all edges of the generalized dependence graph that are strongly satisfied by the solution in (b);
(d) partition the remaining nodes and edges of the generalized dependence graph into fission loops represented by the induced generalized dependence subgraphs,
(e) iteratively perforin (a) through (d) on each set of constraints induced by the generalized dependence subgraphs until all dimensions have been scheduled.

79. The custom computing apparatus of claim 78, wherein the configuration further comprises a configuration to perform the following for each level of parallelism and memory hierarchy of the second computing apparatus:
find at least one multi-dimensional schedule using at least one of (a)-(e);
optimize the program with the at least one multi-dimensional schedule;
partially evaluate the optimized program resulting from scheduling the received program with the multi-dimensional schedule;
filter at least one of the generalized dependence subgraph using the partial evaluation of the optimized program and creating a set of partially scheduled generalized dependence subgraphs;
devise multi-dimensional tiles for each partially scheduled generalized dependence subgraph using the at least one multi-dimensional schedule; and
repeat the procedure for at least one of the multi-dimensional tiles and ad least one of the filtered partially scheduled generalized dependence subgraphs for the other levels of parallelism and memory hierarchy of the second computing apparatus.

80. The custom computing apparatus of claim 46, wherein the configuration further comprises a configuration to construct a single multi-dimensional convex affine space of all legal schedules of the received program.

81. The custom computing apparatus of claim 46, wherein said single multi-dimensional convex affine space of all legal schedules of the received program is used in the optimization process.

82. The custom computing apparatus of claim 81, wherein the single multi-dimensional convex affine space of all legal schedules of the received program is traversed using exhaustive search during the optimization process.

83. The custom computing apparatus of claim 82, wherein the single multi-dimensional convex affine space of all legal schedules of the received program is traversed using a heuristic driven search during the optimization process.

84. The custom computing apparatus of claim 82, wherein said single multi-dimensional convex affine space of all legal schedules of the received program serves as feasible domain to optimize a cost function during the optimization process.

85. The custom computing apparatus of claim 82, wherein the configuration further comprises a configuration to assign a strong satisfaction variable $E_{\{k,e\}}$ to each schedule dimension k and each edge e of the at least one strongly connected component, the strong satisfaction variable equal to one when the schedule difference at dimension k strictly satisfies edge e, zero otherwise.

86. The custom computing apparatus of claim 82, wherein the configuration further comprises a configuration to assign a loop permutability Boolean variable $p_{\{k,e\}}$ to each schedule dimension k and each edge e of the at least one strongly connected component, said loop permutability Boolean variable equal to zero when $E_{\{k, e\}}=E_{\{k-1, e\}}=1$, one otherwise.

87. The method of claim 82, wherein the configuration further comprises a configuration to assign a statement permutability Boolean variable $p_{\{k,a\}}$ to each schedule dimension k and statement a of the at least one strongly connected component, the statement permutability Boolean variable equal to zero only if the schedule dimensions k−1 and k are permutable in the loop in which a reside.

88. The custom computing apparatus of claim 82, wherein the configuration further comprises a configuration to:
derive a first set of multi-dimensional schedule difference constraints; and
use the first set of multi-dimensional difference constraints to ensure that dimensions of schedules of loops linked by a dependence edge in the generalized dependence graph do not influence each other at depth k if the dependence has been strongly satisfied up to depth k−1.

89. The custom computing apparatus of claim 82, wherein the configuration further comprises a configuration to derive a set of multi-dimensional permutability constraints that link said strong satisfiability variables to corresponding said loop permutability Boolean variables.

90. The custom computing apparatus of claim 82, wherein the configuration further comprises a configuration to derive a set of multi-dimensional constraints that ensure said statement permutability Boolean variables to be equal for all the statements in the same loop nest.

* * * * *

UNITED STATES PATENT AND TRADEMARK OFFICE
CERTIFICATE OF CORRECTION

| | |
|---|---|
| PATENT NO. | : 8,572,590 B2 |
| APPLICATION NO. | : 12/561152 |
| DATED | : October 29, 2013 |
| INVENTOR(S) | : Richard A. Lethin et al. |

It is certified that error appears in the above-identified patent and that said Letters Patent is hereby corrected as shown below:

In the Specification

At Column 1, Line 8, under the heading "GOVERNMENT INTERESTS" should read:
– This invention was made with government support under Contract No. W9113M-08-C-0146 awarded by the U.S. Army Space & Missile Defense Command. The government has certain rights in the invention. –

Signed and Sealed this
Twenty-third Day of August, 2022

Katherine Kelly Vidal
*Director of the United States Patent and Trademark Office*